United States Patent
Dai

(10) Patent No.: US 11,063,461 B2
(45) Date of Patent: *Jul. 13, 2021

(54) MOBILE PHONE APP CONTROL-BASED ENERGY-SAVING CHARGER

(71) Applicant: SHENZHEN ZNKL TECHNOLOGY CO., LTD, Shenzhen (CN)

(72) Inventor: Xueshi Dai, Shenzhen (CN)

( * ) Notice: Subject to any disclaimer, the term of this patent is extended or adjusted under 35 U.S.C. 154(b) by 432 days.

This patent is subject to a terminal disclaimer.

(21) Appl. No.: 15/985,684

(22) Filed: May 21, 2018

(65) Prior Publication Data

US 2018/0269707 A1    Sep. 20, 2018

Related U.S. Application Data

(63) Continuation of application No. PCT/CN2016/105282, filed on Nov. 10, 2016.

(30) Foreign Application Priority Data

Nov. 20, 2015 (CN) .......................... 201510805909.9

(51) Int. Cl.
*H02J 7/00* (2006.01)
*H02J 7/02* (2016.01)
(Continued)

(52) U.S. Cl.
CPC ....... *H02J 7/0077* (2013.01); *H01M 10/4257* (2013.01); *H01M 10/44* (2013.01);
(Continued)

(58) Field of Classification Search
CPC .............................................. H02J 7/007182
See application file for complete search history.

(56) References Cited

U.S. PATENT DOCUMENTS 9,007,023 B2    4/2015    Dao
2013/0093381 A1*    4/2013    McGinley ............. H02J 7/0068
320/107

(Continued)

FOREIGN PATENT DOCUMENTS

CN    201490745 U    5/2010
CN    201576721 U    9/2010
(Continued)

OTHER PUBLICATIONS

CN10243762 abstract translation (Year: 2012).*
(Continued)

*Primary Examiner* — Drew A Dunn
*Assistant Examiner* — Tynese V McDaniel
(74) *Attorney, Agent, or Firm* — Erson IP (Nelson IP)

(57) ABSTRACT

The present invention discloses a mobile phone APP control-based energy-saving charger, including a bridge rectifier circuit, a switch control circuit, a high-frequency transformer, and a low-voltage output circuit that are sequentially connected in series. The charger further includes: an electronic switch connected in series between the bridge rectifier circuit and the switch control circuit, an APP signal demodulation circuit for demodulating a mobile phone-side APP control signal and outputting a power-off control signal, an isolating drive circuit for isolating the control signal, and a power-on self-holding circuit connected to the isolating drive circuit and a control end of the electronic switch, where the power-on self-holding circuit controls on and off of the electronic switch according to the isolated control signal and provides a short-time ON level to the control end of the electronic switch at the beginning of power-on of the charger so as to keep the electronic switch on.

8 Claims, 25 Drawing Sheets

(51) Int. Cl.
*H01M 10/42* (2006.01)
*H01M 10/44* (2006.01)

(52) U.S. Cl.
CPC . *H02J 7/02* (2013.01); *H02J 7/00* (2013.01); *H02J 7/0049* (2020.01)

(56) References Cited

U.S. PATENT DOCUMENTS

| | | | |
|---|---|---|---|
| 2013/0241488 A1 | 9/2013 | Dao | |
| 2015/0229149 A1* | 8/2015 | Fahlenkamp | H02J 7/02 320/114 |
| 2018/0269701 A1* | 9/2018 | Dai | H02J 7/0031 |

FOREIGN PATENT DOCUMENTS

| | | | |
|---|---|---|---|
| CN | 102097841 A | | 6/2011 |
| CN | 102437627 A | * | 5/2012 |
| CN | 102437627 A | | 5/2012 |
| CN | 202340141 U | | 7/2012 |
| CN | 105006874 A | * | 10/2015 |
| CN | 105006874 A | | 10/2015 |
| CN | 105244980 A | | 1/2016 |
| CN | 205104965 U | | 3/2016 |

OTHER PUBLICATIONS

CN 102437627 description translation (Year: 2012).*
CN105006874 abstract translation (Year: 2015).*
CN105006874 description translation (Year: 2015).*
International Search Report of PCT/CN2016/105282, dated Dec. 29, 2016.

* cited by examiner

| Fig. 2A | Fig. 2B | Fig. 2C | Fig. 2D |
| --- | --- | --- | --- |
| Fig. 2G | | Fig. 2F | Fig. 2E |

| Fig. 3A | Fig. 3B | Fig. 3C | Fig. 3D |
| --- | --- | --- | --- |
| Fig. 3G | | Fig. 3F | Fig. 3E |

| Fig. 6A | Fig. 6B | Fig. 6C | Fig. 6D |
|---|---|---|---|
| Fig. 6G | | Fig. 6F | Fig. 6E |

| Fig. 7A | Fig. 7B | Fig. 7C | Fig. 7D |
| Fig. 7G | | Fig. 7F | Fig. 7E |

MOBILE PHONE APP CONTROL-BASED ENERGY-SAVING CHARGER

CROSS-REFERENCE TO RELATED APPLICATIONS

This application is a continuation of International Patent Application No. PCT/CN2016/105282 with a filing date of Nov. 10, 2016, designating the United States, now pending, and further claims priority to Chinese Patent Application No. 201510805909.9 with a filing date of Nov. 20, 2015, designating the United States, now pending. The content of the aforementioned applications, including any intervening amendments thereto, are incorporated herein by reference.

TECHNICAL FIELD

The present invention relates to a charger, and in particular, to a charger that is based on a control signal sent by a mobile phone-side APP or operating system and is capable of powering off after completion of charging to realize zero standby power consumption so as to reduce no-load loss, achieve energy saving, and improve charging safety.

BACKGROUND OF THE PRESENT INVENTION

With the development of society and constant progress of science and technology, digital electronic products like mobile phones have currently become indispensable life necessities in people's daily life. Such electronic products as mobile phones commonly use lithium batteries for power supply, and people get used to using the electronic products in the daytime and charging them at night, so charger devices are commonly in power-on states for a long time. Some people place chargers in power-on standby states for more than ten hours or several days or even all year around, causing the chargers to remain in meaningless no-load energized states for a long time, which not only wastes energy, but also accelerates the aging of the charging devices and even causes safety accidents. Meanwhile, since the current technology is not perfect enough to completely settle the issue of automatically cutting off electrical connection to a charger or a charged device, especially cutting off electrical connection to mains lines when charging is completed, no-load standby loss and meanwhile potential safety hazards exist.

Mobile phone chargers now commonly use off-line flyback switching circuits, and the circuits convert alternating currents of 85 V to 275 V provided by a power grid into direct-current voltages required by electronic devices. In a normal working state, the loss of a flyback switching power supply mainly includes conduction loss and switching loss as well as control circuit loss. In a standby state, since the output current of the system is nearly zero, the conduction loss can be ignored, and the switching loss and the control circuit loss become the main system standby power consumption. Referring to FIG. 2, the standby power loss existing in the present application mainly includes start loss (R201, R202), absorption loss (R203, C201), core loss (T) of a high-frequency transformer, reverse recovery loss (D301) of an output rectifier tube, drive loss (R211), and switching loss (Q201). The standby power loss is a serious waste due to the particularity of the charger, that is, restart is not needed after completion of charging in a complete charging process.

Fire accidents frequently reported in newspapers or news media that are caused by charging of the digital electronic products like mobile phones always remind people of the importance of charging safety. While charging devices have constantly improved and perfected protection functions, various charging protection apparatuses or devices have continuously come onto the market. Such charging protection apparatuses or devices play a positive role in reducing charging safety accidents. However, such protection apparatuses also have the following deficiencies: 1. Human participation is required, that is, the apparatus needs to be actively turned on or started by the user for operation, for example, the apparatus can be used only when a button switch is pressed for start, so the use is inconvenient 2. A timing apparatus, where the timing apparatus is used for manually setting a charging time, and power turned off when the time expires. Since the time for a full charge of the battery is uncertain, that is, the charging time is different if the remaining capacity of the battery is different, the timing time can solve the power-off problem only by increasing the time, resulting in inconvenient use. 3. Since current mainstream chargers commonly use high-frequency switching power transformer circuit structures (traditional iron-core transformers have gradually exited the market), there are technical difficulties in realizing the power-off function by controlling on and off of a high-voltage end using a low voltage of an output end, especially for control using a relay. Due to the volume of the relay, the problem of product miniaturization and microminiaturization cannot be solved, and therefore, it is almost impossible to solve the power-off problem using a relay on a mobile phone charger.

Although the standby power consumption is gradually lowered or reduced with the existing charger technology, the problem of power loss in the standby state still cannot be solved, and zero standby power consumption cannot be realized.

SUMMARY OF PRESENT INVENTION

In order to solve the aforementioned problems in the prior art, the present invention provides a charger that is based on a control signal sent by a mobile phone-side APP or operating system and is capable of automatically powering off after completion of charging, so as to reduce no-load loss, achieve energy saving, and improve charging safety, thereby achieving the purpose of zero standby power consumption.

In order to solve the aforementioned technical problems, the technical solution provided in the present invention is to design a mobile phone APP control-based energy-saving charger, including a bridge rectifier circuit, a switch control circuit, a high-frequency transformer, and a low-voltage output circuit that are sequentially connected. The low-voltage output circuit supplies power to a mobile phone through a port of a standard USB socket. The charger further includes: an electronic switch connected in series between the bridge rectifier circuit and the switch control circuit, and an APP signal demodulation circuit, where the APP signal demodulation circuit receives, through the port of the standard USB socket of the charger, a control signal sent by a mobile phone-side APP or operating system (for simplicity of description, the "control signal sent by an APP or operating system" is called an "ARP control signal" for short), and outputs a control instruction according to the APP control signal: an isolating drive circuit, connected to the APP signal demodulation circuit and used for isolated feedback of the control signal; and a power-on self-holding circuit, connected to the isolating drive circuit and a control end of the electronic switch, and used for controlling on and off of the electronic switch according to the isolated control signal, and providing a short-time ON level to the control end of the electronic switch at the beginning of power-on of the charger so as to keep the electronic switch on.

The isolating drive circuit includes a photoelectric coupler, an input end of photoelectric coupler is connected to the APP signal demodulation circuit, and an output end of photoelectric coupler is connected to the power-on self-holding circuit.

The electronic switch adopts an NMOS transistor and is connected in series in a negative output line of the bridge rectifier circuit; the, power-on self-holding circuit includes a first resistor, a first capacitor, and a second resistor that are connected in series between a positive output line and the negative output line of the bridge rectifier circuit, a third resistor is connected in series between a connection point of the first resistor and the first capacitor and a collector of the photoelectric coupler, a connection point of the first capacitor and the second resistor is connected to an emitter of the photoelectric coupler and a gate of the electronic switch, and a fourth resistor and a voltage-stabilizing tube are connected in parallel between the gate and a source of the electronic switch; a restart button is connected in parallel at two ends of the first capacitor, and the restart button adopts a normally open button.

The electronic switch adopts a PMOS transistor and is connected in series in a positive output line of the bridge rectifier circuit; the power-on self-holding circuit includes a first resistor, a second resistor, and a first capacitor that are connected in series between the positive output line and a negative output line of the bridge rectifier circuit, a connection point of the first resistor and the second resistor is connected to a gate of the electronic switch and a collector of the photoelectric coupler, an emitter of the photoelectric coupler is connected to the negative output line of the bridge rectifier circuit through a third resistor, and a fourth resistor and a voltage-stabilizing tube are connected in parallel between the gate and a source of the electronic switch, a restart button AN is connected in parallel at two ends of the first capacitor, and the restart button adopts a normally open button.

A direct-current power source and a ground used by the APP signal demodulation circuit are connected to an output end of the low-voltage output circuit, the direct-current power source is connected to the ground through a fifth resistor, the photoelectric coupler and a switching tube, a forty-second resistor is disposed between the direct-current power source and the switching tube; the direct-current power source is current-limited through a forty-first resistor and is voltage-stabilized to provide a reference voltage source; the reference voltage source is connected to the ground through a thirty-fifth resistor, a thirty-sixth resistor, and a thirty-seventh resistor that are connected in series; the reference voltage source is connected to the ground through a thirty-eighth resistor, a thirty-ninth resistor, and a fortieth resistor that are connected in series; the direct-current power source is connected to the ground through a thirty-first resistor and a thirty-second resistor that are connected in series; the direct-current power source is connected to the ground through a thirty-third resistor and a thirty-fourth resistor that are connected in series; the APP signal demodulation circuit is provided with DP+ (Digital Positive) and DM− (DigitalMinus) connection ends and is separately connected to D+ (DATA+ or Data Positive) and D− (DATA− or Data Minus) in the standard USB socket, and receives the mobile phone-side APP control signal through a data line D+ and a data line D− during charging; a connection point of the thirty-fifth resistor and the thirty-sixth resistor is connected to an inverting input end of a first comparator, a connection point of the thirty-sixth resistor and the thirty-seventh resistor is connected to an inverting input end of a second comparator, the end DM− is connected to a connection point of the thirty-first resistor and the thirty-second resistor as, well as non-inverting input ends of the first comparator and the second comparator; a connection point of the thirty-eighth resistor and the thirty-ninth resistor is connected to an inverting input end of a third comparator, a connection point of the thirty-ninth resistor and the fortieth resistor is connected to an inverting input end of a fourth comparator, the end DP+ is connected to a connection point of the thirty-third resistor and the thirty-fourth resistor as well as non-inverting input ends of the third comparator and the fourth comparator; output ends of the first comparator and the second comparator are respectively connected to two input ends of a second NAND gate, output ends of the third comparator and the fourth comparator are respectively connected to two input ends of a third NAND gate, output ends of the second NAND gate and the third NAND gate are respectively connected to two input ends of a first NAND gate, and an output end of the first NAND gate is connected to a control end of the switching tube through a fourth NOT gate.

A direct-current power source and a ground used by the APP signal demodulation circuit are connected to an output end of the low-voltage output circuit, the direct-current power source is connected to the ground through a switching tube, a fifth resistor, and the photoelectric coupler, a forty-second resistor is disposed between the switching tube and the ground; the direct-current power source is current-limited through a forty-first resistor and is voltage-stabilized to provide a reference voltage source. The reference voltage source is connected to the ground through a thirty-fifth resistor, a thirty-sixth resistor, and a thirty-seventh resistor that are connected in series; the reference voltage source is connected to the ground through a thirty-eighth resistor, a thirty-ninth resistor, and a fortieth resistor that are connected in series; the direct-current power source is connected to the ground through, a thirty-first resistor and a thirty-second resistor that are connected in series; the direct-current power source is connected to the ground through a thirty-third resistor and a thirty-fourth resistor that, are connected in series; the APP signal demodulation circuit is provided with DP+ (Digital Positive) and DM− (DigitalMinus) connection ends and is separately connected to D+ (DATA+ or Data Positive) and D− (DATA− or Data Minus) in the standard USB socket, and receives the mobile phone-side APP control signal through a data line D+ and a data line D− during charging; a connection point of the thirty-fifth resistor and the thirty-sixth resistor is connected to an inverting input end of the first comparator, a connection point of the thirty-sixth resistor and the thirty-seventh resistor is connected to an inverting input end of the second comparator, the end DM− is connected to a connection point of the thirty-first resistor and the thirty-second resistor as well as non-inverting input ends of the first comparator and the second comparator; a connection point of the thirty-eighth resistor and the thirty-ninth resistor is connected to an inverting input end of a third comparator, a connection point of the thirty-ninth resistor and the fortieth resistor is connected to an inverting input end of a fourth comparator, the end DP+ is connected to a connection point of the thirty-third resistor and the thirty-fourth resistor as well as non-inverting input ends of the third comparator and the fourth comparator; output ends of the first comparator and the second comparator are respectively connected to two input ends of a second NAND gate, output ends of the third comparator and the fourth comparator are respectively connected to two input ends of a third NAND gate, output ends of the second NAND gate and the third NAND gate are respectively connected to two input ends of a first NAND gate, and an output end of the first NAND gate is connected to a control end of the switching tube through a buffer.

The aforementioned APP signal demodulation circuit may further adopt a control chip, a direct-current power source and a ground used by the APP signal demodulation circuit are connected to an output end of the low-voltage, output circuit, two signal pins DP+ and DM− of the control chip are respectively connected to ends D+ and D− in the USB socket through a tenth resistor and an eleventh resistor, a seventh resistor and an eighth resistor are connected in series between the direct-current power source and the ground, a connection point of the seventh and eighth resistors feeds back a voltage value of the direct-current power source to the control chip, a fifth resistor and an input side of the photoelectric coupler are connected in series between the direct-current power source and a control pin of the control chip, and a sixth resistor and an LED light are connected in series between an indication pin of the control chip and the ground.

At the beginning of power-on, the control chip drives the photoelectric coupler to turn on, it is detected whether the direct-current power source falls within a safe charging voltage range, if the voltage exceeds the safe charging voltage range, the control chip controls the photoelectric coupler to cut off, and the charger realizes overvoltage protection; when the direct-current power source falls within the safe charging voltage range, the two signal pins of the control chip send a Charger Ready signal to the mobile phone, after the mobile phone receives the Charger Ready signal through D+ and D− in the USB socket, the mobile phone APP returns a charging signal, if the control chip does not receive the charging signal of the mobile phone within a period of time from sending of the Charger Ready signal, he control chip controls the photoelectric coupler to cut off, and the charger realizes no-load protection; when the control chip receives the charging signal of the mobile phone, the control chip continues controlling the photoelectric coupler to turn on, and the charger continuously performs charging; when the control chip receives a Stop Charging signal of the mobile phone, the control chip immediately controls the photoelectric coupler to cut off, and the charger stops charging and enters an, energy-saving state.

The aforementioned LED light is used for displaying a working state of the charger; when the charger is connected to the mains, the control chip controls the LED light to flash quickly, indicating that the charger gets ready; when the charger normally performs charging, the control chip controls the LED light to flash slowly, when the charger stops charging, the control chip controls the LED light to go off.

The aforementioned control chip may adopt an SN8P675 chip.

As compared with the prior art, in the present invention, the connection between the charger and the mains can be automatically cut off after a mobile phone completes charging, thereby eliminating no-load loss, realizing zero standby power consumption, saving electrical energy, prolonging the service life of a charging device, and improving electric safety; and furthermore, the present invention has the advantages of compact size and low costs.

DETAILED DESCRIPTION OF PREFERRED EMBODIMENTS

In order to make the objectives, technical solutions, and advantages of the present invention more comprehensible, the present invention is described in further detail below with reference to accompanying drawings and embodiments. It should be understood that the specific embodiments described herein are only used for explaining the present invention, and not for limiting the present invention.

Figure 1:
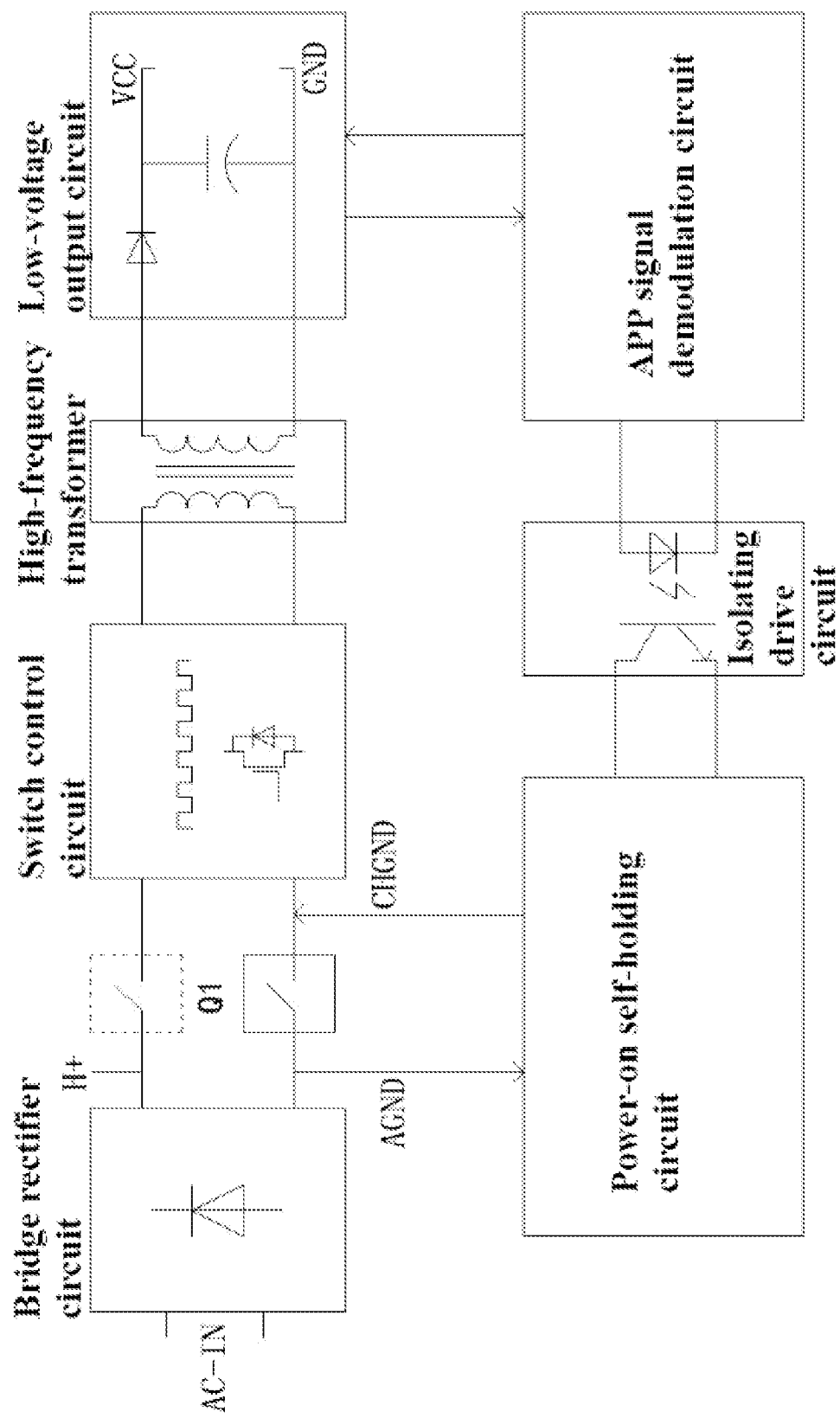
FIG. 1 is a schematic block diagram o he present invention.

Referring to the schematic block diagram shown in FIG. 1, the present invention discloses a mobile phone APP control-based energy-saving charger, including a bridge rectifier circuit, an electronic switch Q1, a switch control circuit, a high-frequency transformer, and a low-voltage output circuit (the low-voltage output circuit charges a mobile phone through a port of a standard USB socket of the charger) that are sequentially connected, as well as an APP signal demodulation circuit, an isolating drive circuit, and a power-on self-holding circuit that are sequentially connected between the low-voltage output circuit and the electronic switch. The APP signal demodulation circuit receives a mobile phone-side APP control signal through the port of the standard USB socket of the charger, and outputs a control instruction according to the APP control signal; the isolating drive circuit is connected to the APP signal demodulation circuit and used for isolated feedback of the control signal, so that high- and low-voltage control lines are electrically isolated; the power-on self-holding circuit is connected to an output end of the isolating drive circuit and a control end of the, electronic switch, controls on and off of the electronic switch according to the isolated control signal, and provides a short-time ON level to the control end of the electronic switch at the beginning of power-on of the charger so as to keep the electronic switch on.

Referring to FIG. 1, at the beginning of power-on, the power-on self-holding circuit provides a short-time ON level to the electronic switch to turn on the electronic switch upon power-on, the switch control circuit and the high-frequency transformer at the rear end of the electronic switch obtain electricity, and the low-voltage output circuit at the secondary end of the high-frequency transformer outputs a direct current. Upon power-on, the APP signal demodulation circuit continuously sends an ON control signal, the control signal is isolated by the isolating drive circuit and then transmitted to the power-on self-holding circuit, the power-on self-holding circuit controls the electronic switch continuously on, thereby realizing self-holding, and the mobile phone gets continuously charged. When the charging is finished, the mobile phone sends a Stop Charging APP control signal, the APP signal demodulation circuit demodulates the signal and outputs, a charging cut-off control signal, the control signal is isolated by the isolating drive circuit and then transmitted to the power-on self-holding circuit, the power-on self-holding circuit enters a power-off locked state, and controls the electronic switch to cut off, the switch control circuit and the high-frequency transformer at the rear end of the electronic switch lose, electricity, and further, the low-voltage output circuit and the APP signal demodulation circuit both lose electricity, the circuit power consumption is reduced to zero, and therefore, the standby power consumption is basically zero. In this way, the functions of saving electrical energy, prolonging the service life of a charging device, and improving electric safety are realized.

In a preferred embodiment, the isolating drive circuit includes a photoelectric coupler Q2, an input end of the photoelectric coupler is connected to the APP signal demodulation circuit, and an output end of the photoelectric coupler is connected to the power-on self-holding circuit.

Figures 2, 2A:
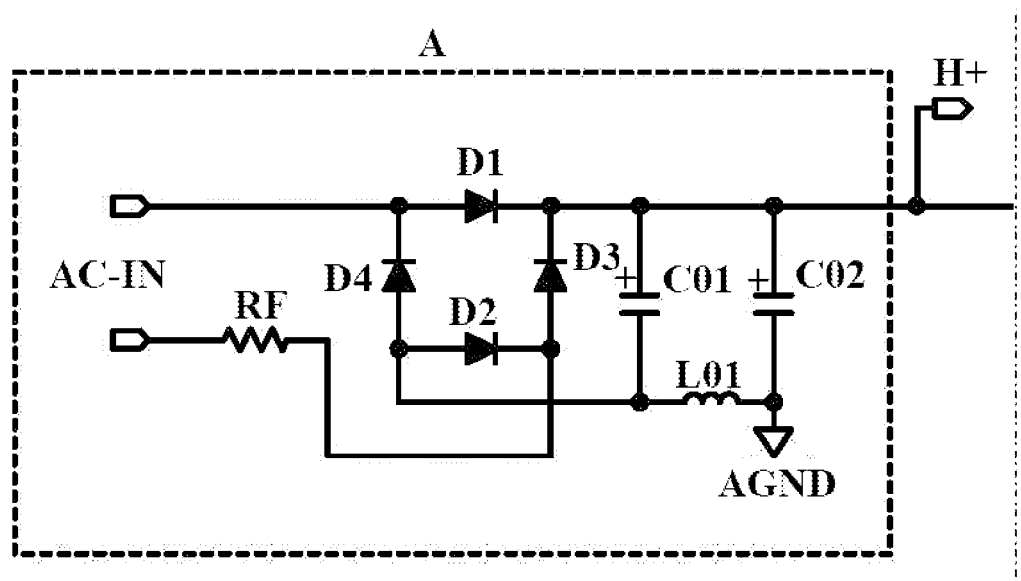
FIG. 2 with partial views FIGS. 2A-2G provide a circuit diagram illustrating that an electronic switch is connected in series in a negative output line of a bridge rectifier circuit. The approximate relationship between the partial views is provided by FIG. 2 and alignment guides on the individual partial views allow for alignment of the partial views given the guidance from FIG. 2.
Figure 2B:
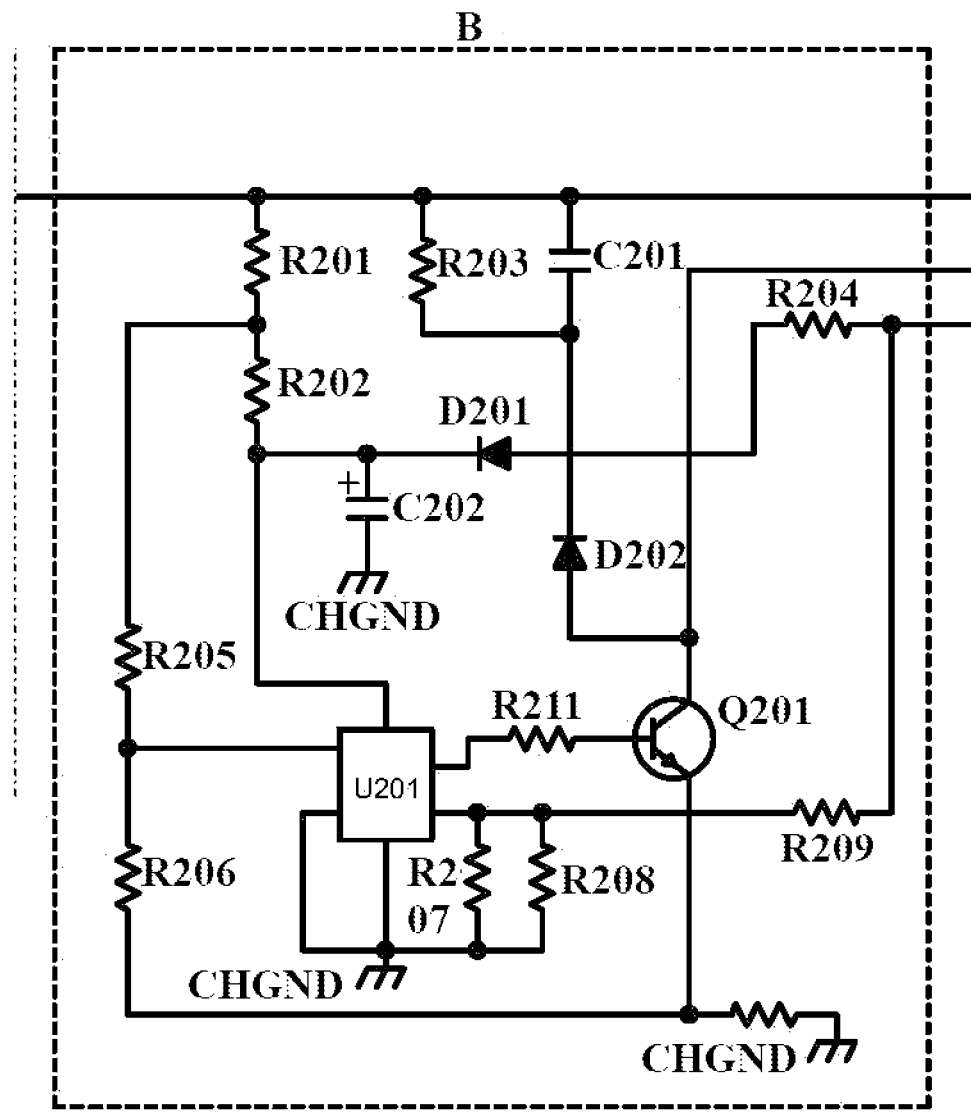
Figure 2C:
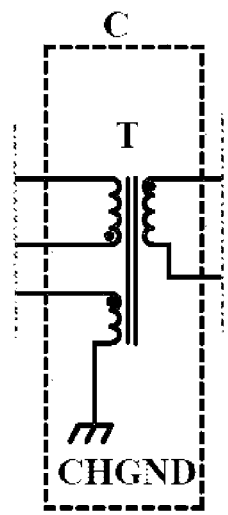
Figure 2D:
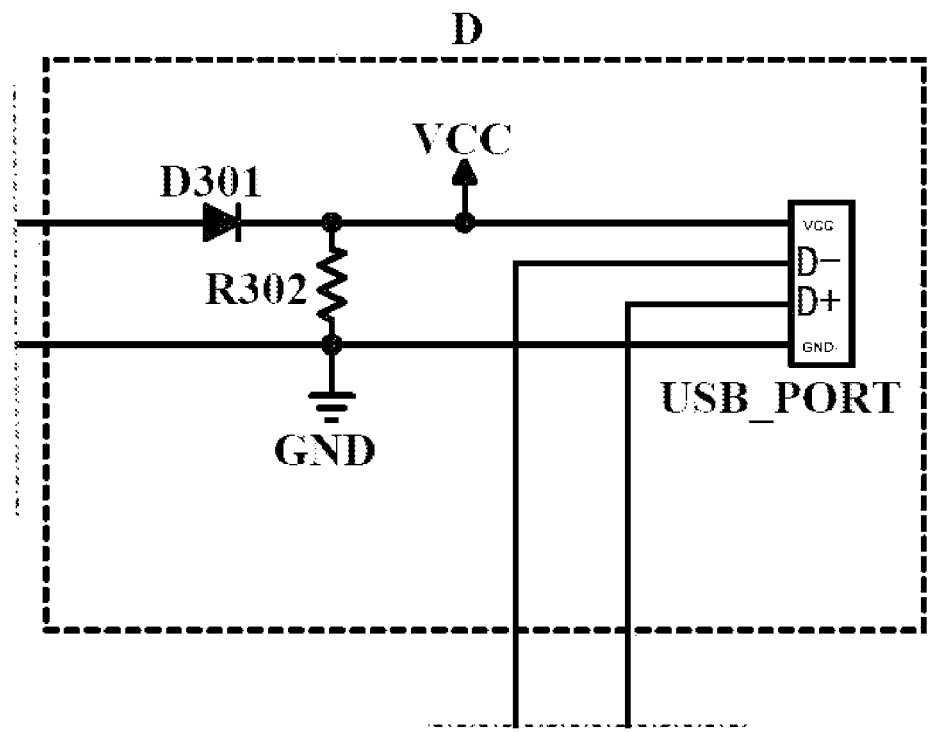
Figure 2E:
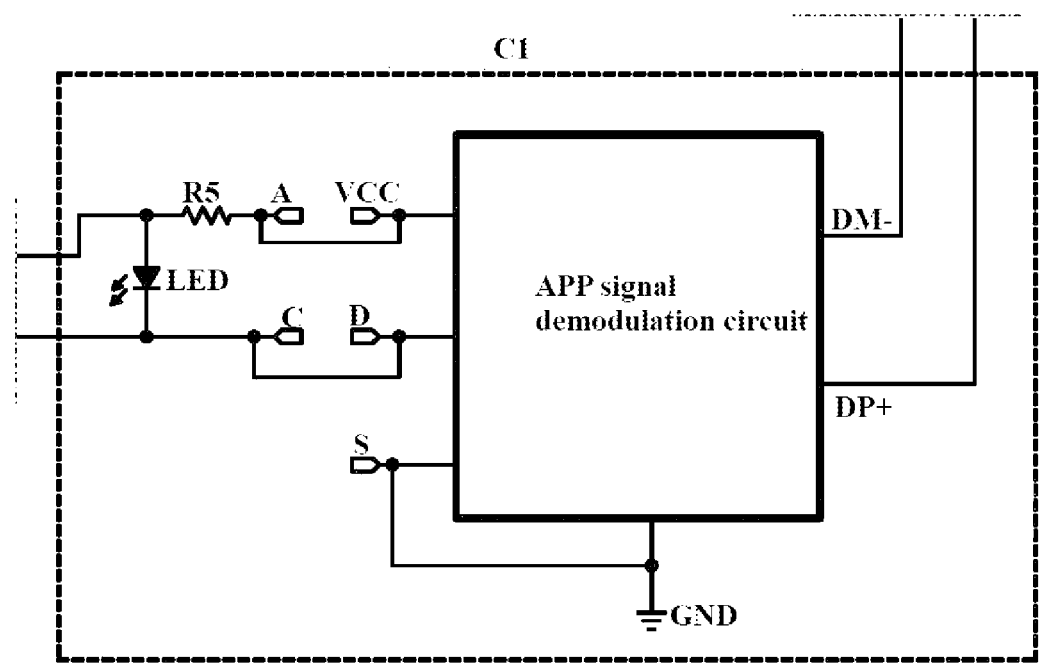
Figure 2F:
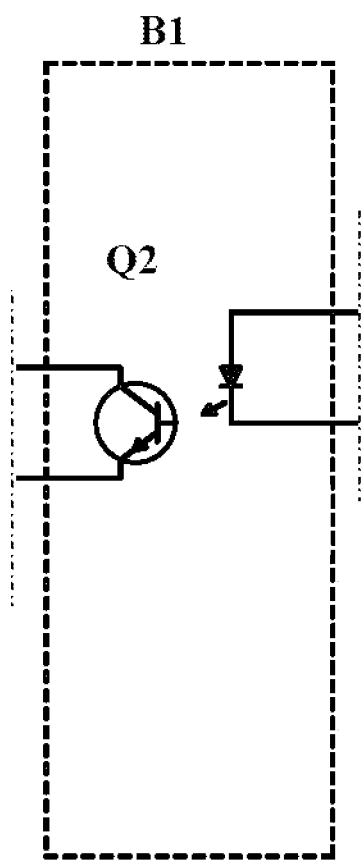
Figure 2G:
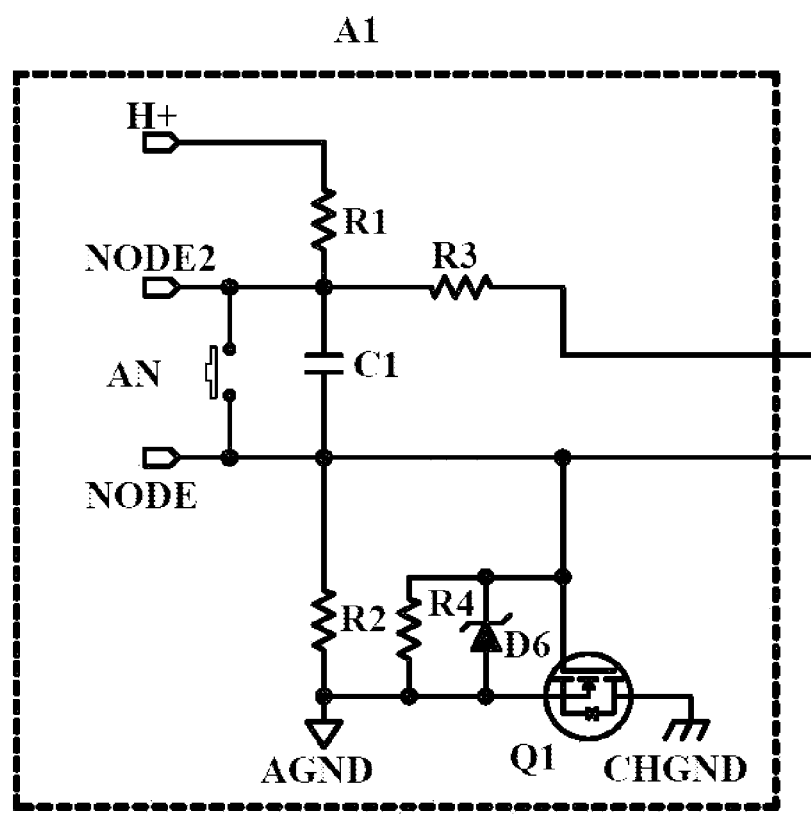

Referring to the preferred embodiment shown in FIG. 2, the electronic switch Q1 adopts an NMOS transistor and is connected in series in a negative output line of the bridge rectifier circuit; the power-on self-holding circuit includes a first resistor R1, a first capacitor C1, and a second resistor R2 that are connected in series between a positive output line and the negative output line of the bridge rectifier circuit, a third resistor R3 is connected in series between a connection point of the first resistor and the first capacitor and a collector of the photoelectric coupler Q2, a connection point of the first capacitor and the second resistor is connected to an emitter of the photoelectric coupler and a gate of the electronic switch, and a fourth resistor R4 and a voltage-stabilizing tube D6 are connected in parallel between the gate and a source of the electronic switch. At the beginning of power-on, according to the principle that a voltage between two ends of a capacitor cannot suddenly change, a voltage between two ends of the first capacitor C1 is 0, which is equivalent to that C1 is short-circuited, an alternating-current mains is rectified by, the bridge rectifier circuit and then outputs a high-voltage direct-current voltage (the value of the high-voltage direct-current voltage is determined by the input 110-220V alternating-current mains), the current flows through R1, C1, and R2, producing a divided voltage on a node NODE of R1 and R2, the voltage at the voltage division point is at a high level, the high level is applied to the gate of Q1, Q1 is turned on, the switch control circuit and the high-frequency transformer at the rear end of Q1 obtain electricity, the low-voltage output circuit at the secondary end of the high-frequency transformer obtains electricity and outputs a charging current, and the APP signal demodulation circuit obtains y and then starts working and continuously sends an ON control signal, to further control the photoelectric coupler Q2 to turn on; a voltage obtained after a positive (H+) voltage of the bridge rectifier circuit is divided through R1, R3, and the output end of Q2 is applied to the gate of Q1, the system forms a self-lock, Q1 is continuously on, and the charger continuously performs charging. As time goes on, the voltage between the two ends of C1 rises to the supply voltage, the direct-current circuit is equivalently broken, the potential of the node NODE is also lowered, at this time, the potential of the gate of Q1 depends on whether the output end of Q2 is connected, that is, depends on whether the mobile phone APP control signal is a power-off control instruction, when the mobile phone side does not send the power-off control instruction, the APP signal demodulation circuit drives the output end of Q2 to be connected, the voltage between the two ends of C1 approximates 0, Q1 is turned on, the system forms a self-lock, and the charger continuously works; when the mobile phone battery is fully charged, the mobile phone sends a charging ending APP control signal, the APP signal demodulation circuit receives the signal and drives and controls Q2 to cut off, and further, Q1 loses the turn-on condition and cuts off. the power-on self-holding circuit enters a power-off locked state, the switch control circuit, the high-frequency transformer, and the like cannot form a loop, the low-voltage output circuit loses electricity, and the current in the entire circuit is basically zero. Therefore, the charger enters a zero standby power consumption state, In view of the above, the power-on self-holding circuit has two working modes: a power-on self-holding mode and a power-off locked mode. 1. The power-on self-holding mode: at the beginning of power-on, the power-on self-holding circuit provides a level sufficient to turn on the electronic switch and controls the electronic switch to be in an ON mode at the same time of power-on, and the time of controlling on of the electronic switch may be set to tens of milliseconds to several seconds according to circuit requirements. 2. The power-off locked mode: the power-on self-holding working mode can only maintain a short ON time of the electronic switch, and afterwards the on and off of the electronic switch will be controlled and determined by Q2, When the output end of Q2 is controlled to be connected, the electronic switch Q1 will be continuously on, and when the output end of Q2 is controlled to be disconnected (in a high-impedance state), the electronic switch Q1 is turned off, and the power-on self-holding circuit enters the power-off locked state. Once the power-on self-holding circuit enters the power-off locked state, the circuit cannot lift the locked state by itself. Since Q2 control is at the low-voltage end, once the, low-voltage end loses power, Q2 control will also fail, and therefore, the power-on self-holding circuit enters the power-off locked state.

Figures 3, 3A:
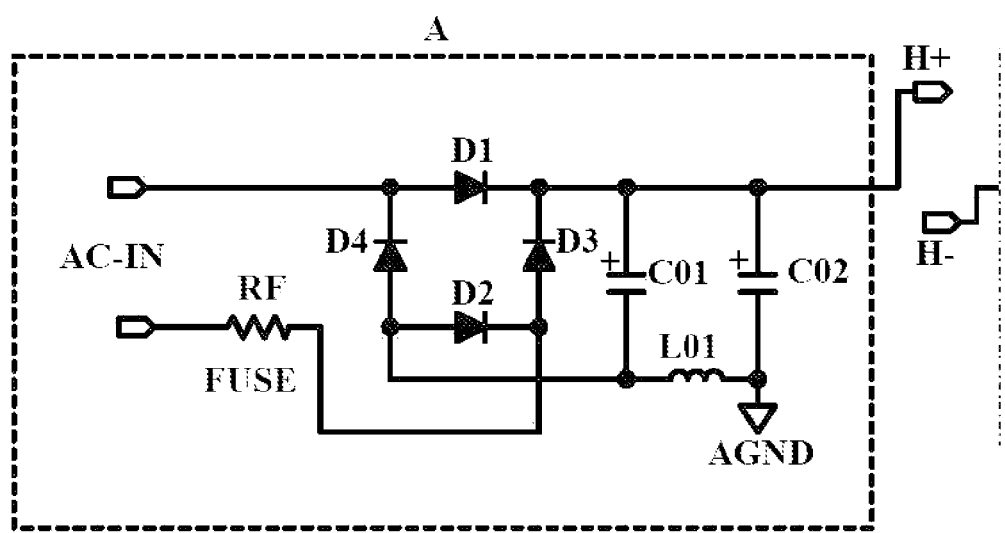
FIG. 3 with partial views FIGS. 3A-3G provide a circuit diagram illustrating that the electronic switch is connected in series in a positive output line of the bridge rectifier circuit. The approximate relationship between the partial views is provided by FIG. 3 and alignment guides on the individual partial views allow for alignment of the partial views given the guidance from FIG. 3;connected in series in a positive output line of the bridge rectifier circuit.
Figure 3B:
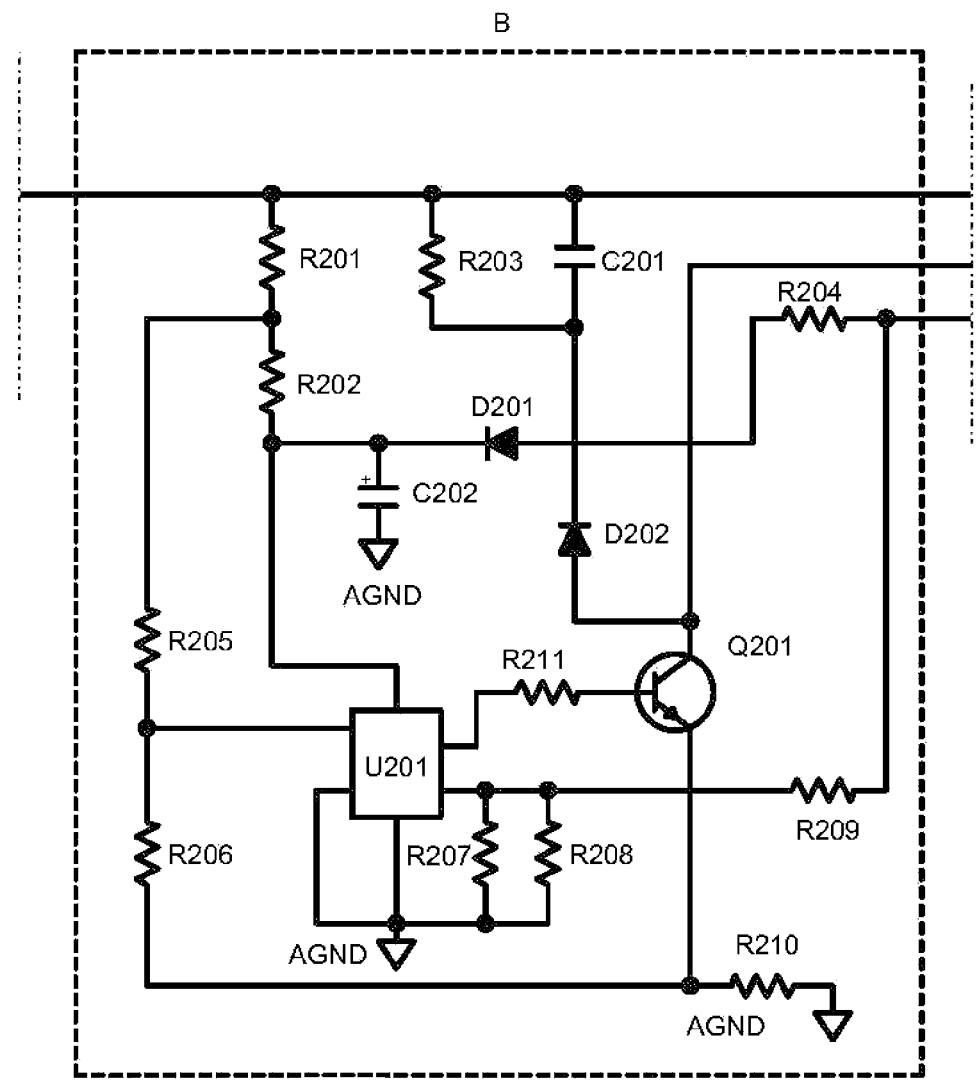
Figure 3C:
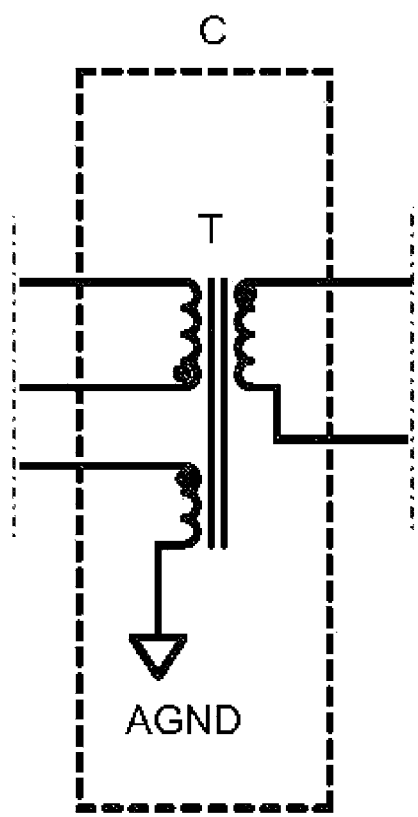
Figure 3D:
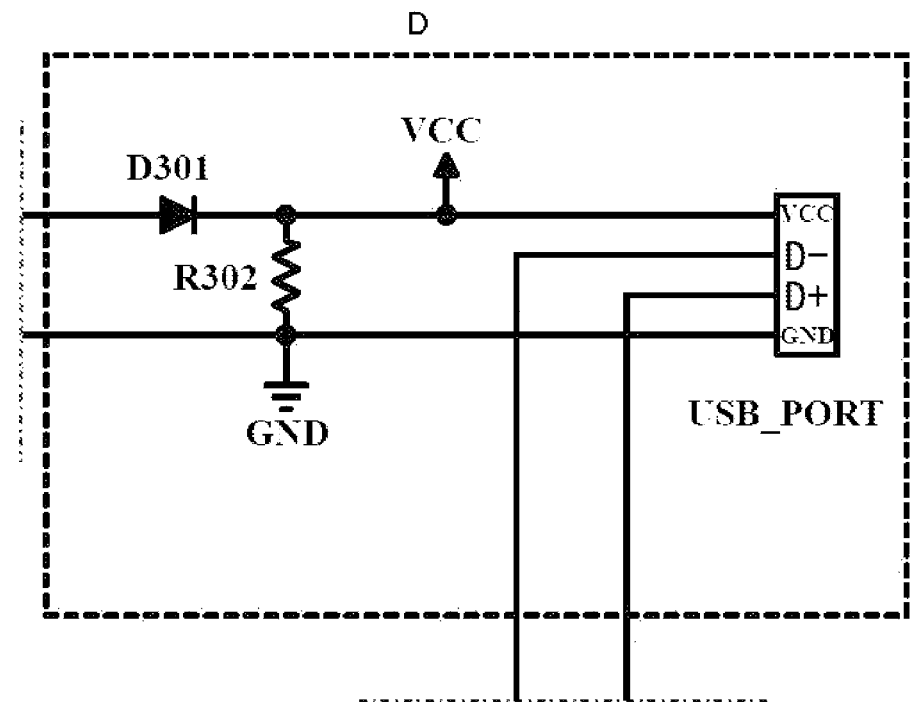
Figure 3E:
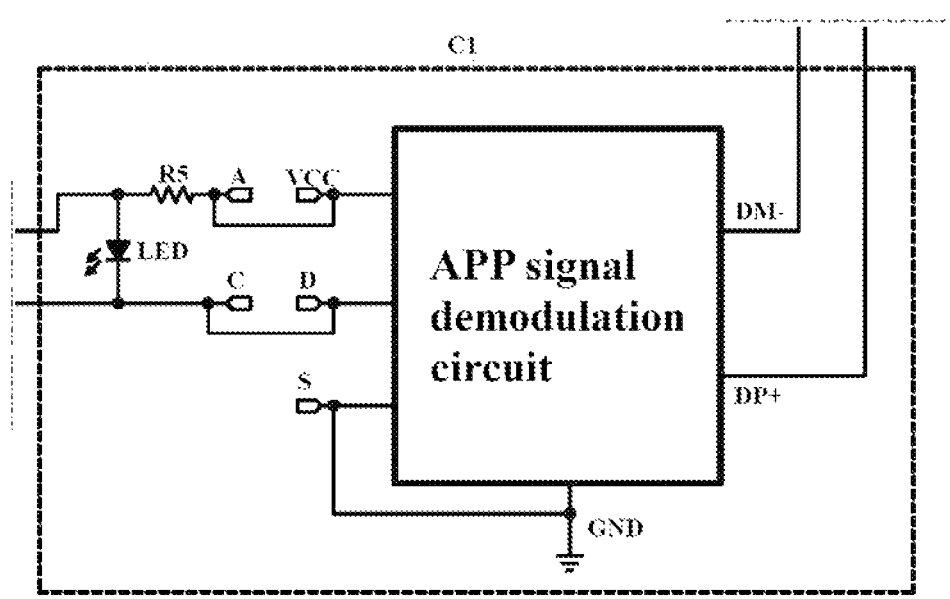
Figure 3F:
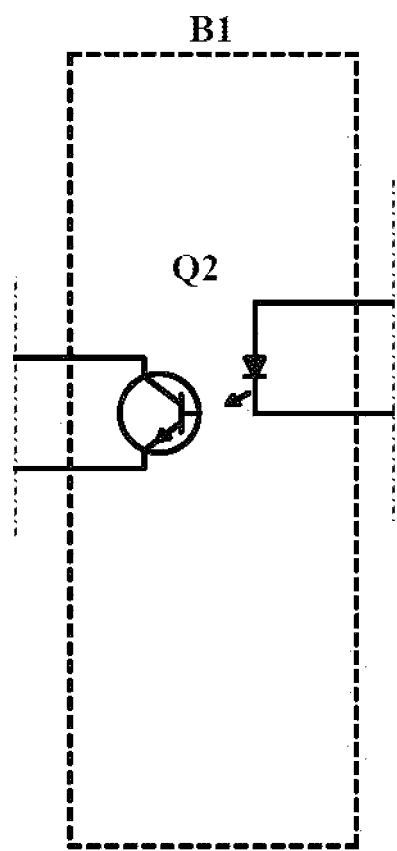
Figure 3G:
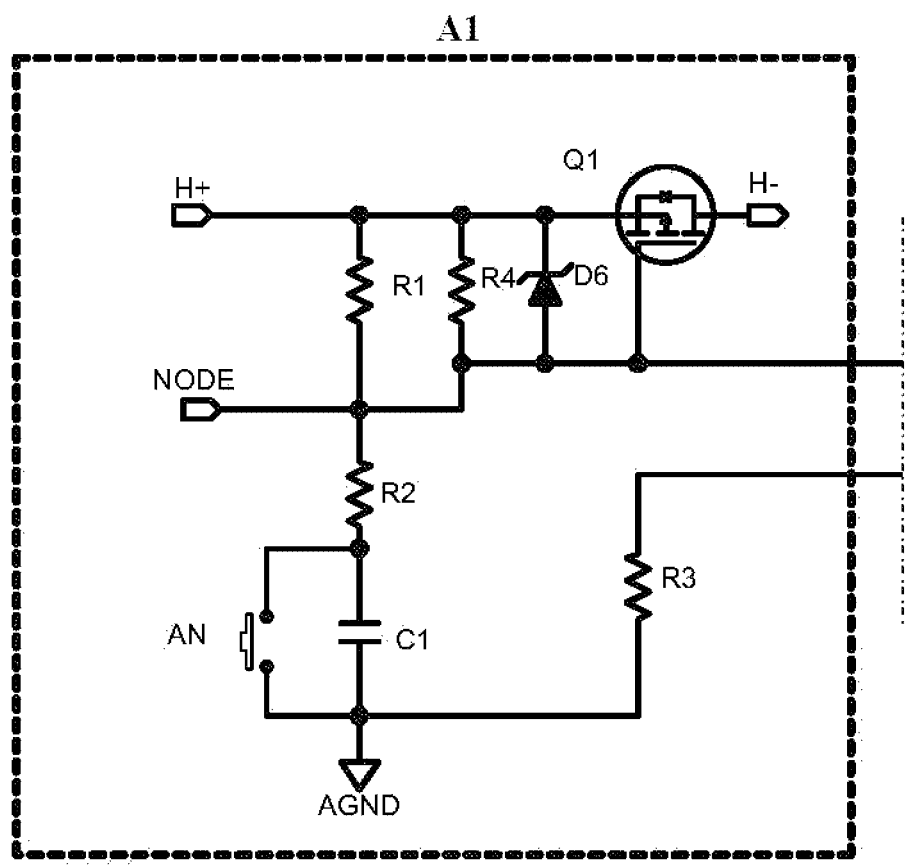

Referring to the preferred embodiment shown in FIG. 3, the electronic switch Q1 in this example adopts a PMOS transistor and is connected in series in a positive output line of the bridge rectifier circuit; the power-on self-holding circuit includes a first resistor R1, a second resistor R2, and a first capacitor that are connected in series between the positive output line and a negative output line of the bridge rectifier circuit, a connection point of the first resistor and the second resistor is connected to a gate of the electronic switch and a collector of the photoelectric coupler Q2, an emitter of the photoelectric coupler is connected to the negative output line of the bridge rectifier circuit through a third resistor R3, and a fourth resistor R4 and a voltage-stabilizing tube D6 are connected in parallel between the gate and a source of the electronic switch. At the beginning of power-on, according to the principle that a voltage between two ends of a capacitor cannot suddenly change, a voltage between two ends of the first capacitor C1 is 0, which is equivalent to that C1 is short-circuited, an alternating-current mains is rectified by the bridge rectifier circuit and then outputs a high-voltage direct-current voltage (the value of the high-voltage direct-current voltage is determined by the input alternating-current mains of 110 V to 220 V), the current flows through R1, R2, and C1, producing a divided voltage on R1 and R2, as compared with the point H+, the voltage division point NODE is of a negative voltage, the negative voltage is applied to the gate of Q1, Q1 is turned on, the switch control circuit and the high-frequency transformer at the rear end of Q1 obtain electricity, the low-voltage output circuit obtains electricity and outputs a charging current, and the APP signal demodulation circuit obtains electricity and then starts working and continuously sends an ON control signal, to further control the photoelectric coupler Q2 to turn on; a positive (H+) voltage of the bridge rectifier circuit is divided through R1, Q2, and R3, a negative voltage at a lower end (end NODE) of R1 is applied to the gate of Q1, the system forms a self-lock, Q1 is continuously on, and the charger continuously works. As time goes on, the voltage between the two ends of C1 gradually rises, the direct-current circuit is equivalently broken, the voltage between the point H+ and the node NODE is also lowered, at this time, the potential of the gate of Q1 depends on whether the output end of Q2 is connected, that is, depends on whether the mobile phone APP control signal is a power-off control instruction, when the mobile phone side does not send the power-off control instruction, the APP signal demodulation circuit drives the output end of Q2 to be connected, Q1 is turned on, the system forms a self-lock, and the charger continuously works; when the mobile phone battery is fully charged, the mobile phone sends a charging, ending APP control signal, the APP signal demodulation circuit receives the signal and drives and controls Q2 to cut off, Q1 loses the turn-on condition and cuts off, the power-on self-holding circuit enters a power-off lock function (or state), the switch control circuit, the high-frequency transformer, and the like cannot form a loop, the low-voltage output circuit loses electricity, and the current in the entire circuit is basically zero. Therefore, the charger enters a zero standby power consumption state.

In practice, after the charger is powered off for protection, it recharging is required or other electronic products need to be charged, it is needed to completely disconnect the charger from the mains network and then connect the charger to the mains network again, so as to normally use the charging protection function. However, this requires frequent plug-in/out of the mains end of the charger. In order to reduce inconvenience caused by plugging in/out of the charger, and improve flexibility and convenience of the operation, a restart button is added. Referring to FIG. 2 and FIG. 3, a restart button AN is connected in parallel at the two ends of the first capacitor C1, and the restart button adopts a normally open button. After the charging protection is powered off, if the charging function needs to be restarted, it is not needed to disconnect the charger from the mains network (or socket); instead, it is only needed to press the start button AN to lift the power-off self-lock function (or state) of the charger, so that the charger can be restarted for normal use, which brings great convenience to the user.

Figure 4:
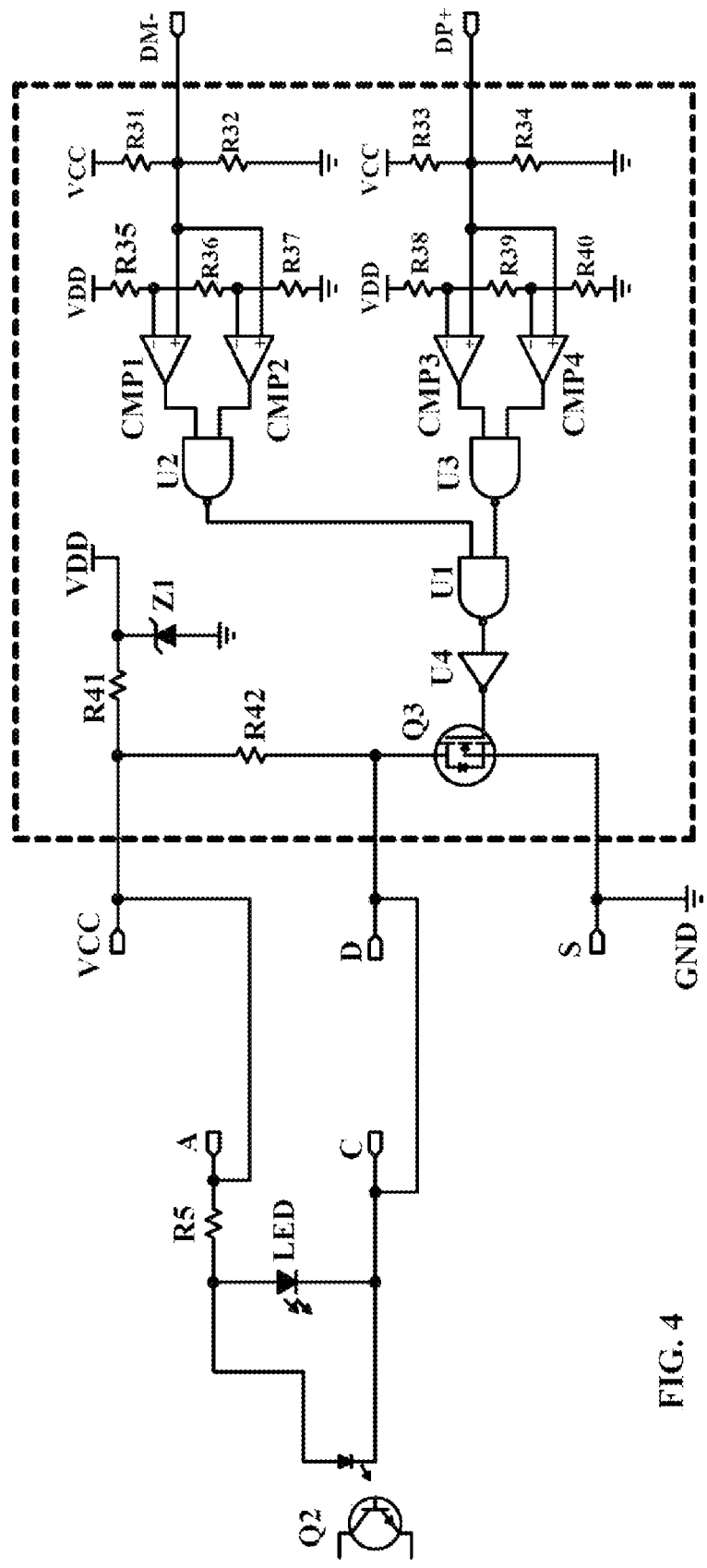
FIG. 4 is a circuit diagram illustrating that an APP signal demodulation circuit adopts a logic circuit controls a cathode of a photoelectric coupler.

Referring to the preferred embodiment shown in FIG. 4, the APP signal demodulation circuit adopts a logic circuit and controls a cathode of the photoelectric coupler. A direct-current power source and a ground used by the APP signal demodulation circuit are connected to an output end of the low-voltage output circuit, the direct-current power source VCC is connected to the ground through a fifth resistor R5, the photoelectric coupler Q2, and a switching tube Q3, and a forty-second resistor R42 is disposed between the direct-current power source and the switching tube; the direct-current power source is current-limited through a forty-first resistor R41 and is voltage-stabilized by Z1 to provide a reference voltage source VDD; the reference voltage source is connected to the ground through a thirty-fifth resistor R35, a thirty-sixth resistor R36, and a thirty-seventh resistor R37 that are connected in series; the reference voltage source is connected to the ground through a thirty-eighth resistor R38, a thirty-ninth resistor R39, and a fortieth resistor R40 that are connected in series; the direct-current power source is connected to the ground through a thirty-first resistor R31 and a thirty-second resistor R32 that are connected in series; the direct-current power source is connected to the ground through a thirty-third resistor R33 and a thirty-fourth resistor R34 that are connected in series; the APP signal demodulation circuit is provided with DP+ (Digital Positive) and DM− (DigitalMinus) connection ends and is separately connected to D+ (DATA+ or Data Positive) end D− (DATA− or Data Minus) in the standard USB socket, and receives the mobile phone-side APP control signal through a data line D+ and a data line D− during charging; a connection point of the thirty-fifth resistor and the thirty-sixth resistor is connected to an inverting, input end of a first comparator CMP1, a connection point of the thirty-sixth resistor and the thirty-seventh resistor is connected to an inverting input end of a second comparator CMP2, the end DM− is connected to a connection point of the thirty-first resistor and the thirty-second resistor as well as non-inverting input ends of, the first comparator and the second comparator; a connection point of the thirty-eighth resistor and the thirty-ninth resistor is connected to an inverting input end of a third comparator CMP3, a connection point of the thirty-ninth resistor and the fortieth resistor is connected to an inverting input end of a fourth comparator CMP4, the end DP+ is connected to a connection point of the thirty-third resistor and the thirty-fourth resistor as well as non-inverting input ends of the third comparator and the fourth comparator; output ends of the first comparator and the second comparator are respectively connected to two input ends of a second NAND gate U2, output ends of the third comparator and the fourth comparator are respectively connected to two input ends of a third NAND gate U3, output ends of the second NAND gate and the third NAND gate are respectively connected to two input ends of a first NAND gate U1, and an output end of the first NAND gate is connected to a control end of the switching tube through a fourth NOT gate U4.

Figure 5:
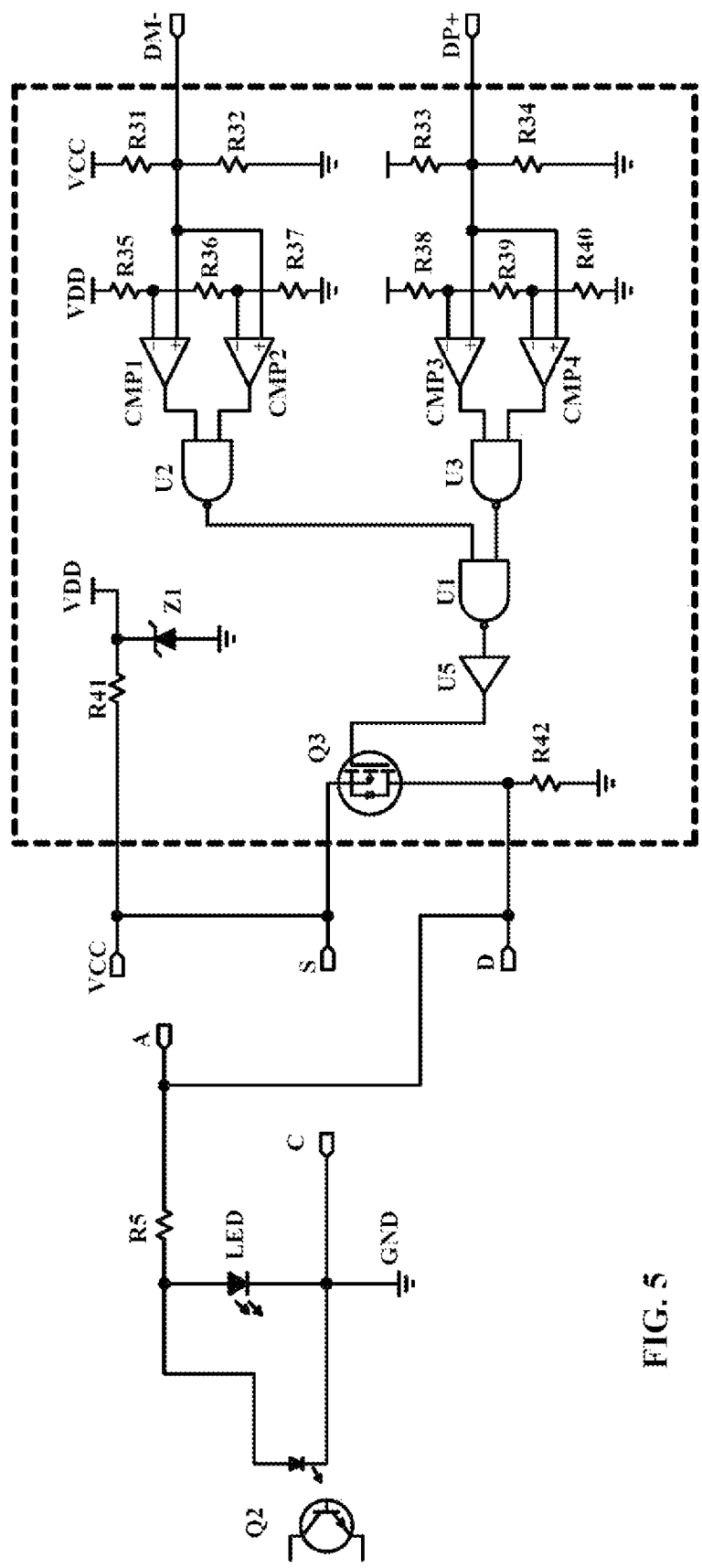
FIG. 5 is a circuit diagram illustrating that the APP signal demodulation circuit adopts a logic circuit and controls an anode of the photoelectric coupler.

FIG. 4 and FIG. 5 illustrate the APP signal demodulation circuit. R35, R36, and R37 form a voltage division circuit, and the voltage division points used as reference voltages of the comparators CMP1 and CMP2 and are respectively connected to inverting input ends of the comparators CMP1 and CMP2. A connection point of R31 and R32 performs voltage division to provide a window voltage, and is meanwhile connected to DM− and non-inverting input ends of the comparator CMP1 and the comparator CMP2, and the value of the window voltage is greater than the reference voltage at the inverting input end of the comparator CMP2 and less than the reference voltage at the inverting input end of the comparator CMP1, R38, R39, and R40 form a voltage division circuit, are used as reference voltages of comparators CMP3 and CMP4, and are respectively connected to inverting input ends of the comparator CMP3 and the comparator CMP4, a connection point of R33 and R34 performs voltage division to provide a window voltage, and meanwhile is connected to DP+ and non-inverting input ends of the comparators CMP3 and CMP4, and the value of the window voltage is greater than the voltage at the inverting input end of the comparator CMP4 and less than the voltage at the inverting input end of the comparator CMP3.

It should be noted that the APP signal demodulation circuit of the present invention is designed through modularization using a logic circuit, and the logic control circuit not only can control an anode at the input end of the photoelectric coupler, but also can control the cathode of the photoelectric coupler. FIG. 4 is a circuit diagram illustrating that the cathode of the photoelectric coupler is controlled, and the working principle thereof is described in detail below by using FIG. 4 as an example: in the figure, the end A is connected to VCC, the end C is connected to D, and the end S is connected to GND. At the beginning of power-on, the window voltage, at the end DM−, of the connection point of R31 and R32 connected to the USB data line D− is less than the potential at the inverting input end of the first comparator CMP1 and greater than the potential at the inverting input end of the second comparator CMP2, and therefore, the output end of the first comparator CMP1 outputs a low level, the output end of the second comparator CMP2 outputs a high level, and further, the NAND gate U2 outputs a high level. Similarly, the window voltage, at the end DP+, of the connection point of R33 and R34 connected to the USB data line D+ is less than the potential at the inverting input end of the third comparator CMP3 and greater than the potential at the inverting input end of the fourth comparator CMP4, and therefore, the output end of the third comparator CMP3 outputs a low level, the output end of the fourth comparator CMP4 outputs a high level, and further, the third NAND gate U3 outputs a high level. Since U2 and U3 both output high levels, and two input ends of U1 are respectively connected to the output ends of U2 and U3, the output end of U1 is at a low level, the low level is inverted by an inverter U4 to output a high level, and the high level is loaded to the gate of Q3 of the NMOS transistor, and therefore, Q3 is turned on, and since the end S is connected to GND, a drain of Q3, namely, the end D, is pulled down to output a low level. Further, the end G controls the cathode at the input end of the photoelectric coupler Q2 to be at a low level, and therefore, the entire circuit system can maintain an ON state, and the charger performs normal output.

Detection and control of charging completion: the mobile phone-side APP software or operating system detects the charging state in real time and sends a Charging Completed power-off control instruction (voltage signal) to D+ and D− upon detecting that the battery is fully charged, the APP signal demodulation circuit receives the power-off control instruction through DP+ and DM−, the power-off control instruction causes the window voltages to change, so that the comparator CMP1, the comparator CMP2, the comparator CMP3, and the comparator CMP4 in the logic control circuit all output high levels, and further, the output ends of U2 and U3 output low levels, U1 outputs a high level, and this high level signal is inverted by U4 to drive the gate of Q3, since the signal obtained after inversion by U4 is at a low level, Q3 is switched from the ON state to an OFF state, and since the drain of Q3 is connected to the resistor R42, the end D outputs a high level, and the cathode at the input end of the photoelectric coupler Q2 turns to a high level. Further, the power-on self-holding circuit enters a power-off locked state, and finally the mobile phone-side operating system or APP can control the charger to realize a power-off function, thereby saving energy and improving electric safety, completely eliminating the waste caused by standby power loss, and realizing zero standby power loss.

FIG. 5 is a circuit diagram illustrating that the APP signal demodulation circuit adopts a logic circuit and controls an anode of the photoelectric coupler, In the figure, the end D is connected to VCC, the end A is connected to the end S, and the end C is connected to GND.

A direct-current power source and a ground used by the APP signal demodulation circuit are connected to an output end of the low-voltage output circuit, the direct-current power source VCC is connected to the ground through a switching tube Q3, a fifth resistor R5, and the photoelectric coupler Q2 and a forty-second resistor R42 is disposed between the switching tube Q3 and the ground; the direct-current power source is current-limited through a forty-first resistor and is voltage-stabilized by Z1 to provide a reference voltage source VDD. The reference voltage source is connected to the ground through a thirty-fifth resistor R35, a thirty-sixth resistor R36 and a thirty-seventh resistor R37 that are connected in series; the reference voltage source is connected to the ground through a thirty-eighth resistor R38, a thirty-ninth resistor R39, and a fortieth resistor R40 that are connected in series; the direct-current power source is connected to the ground through a thirty-first resistor R31 and a thirty-second resistor R32 that are connected in series; the direct-current power source is connected to the ground through a thirty-third resistor R33 and a thirty-fourth resistor R34 that are connected in series; the APP signal demodulation circuit is provided with DP+ and DM− connection ends and is separately connected to D+ and D− in the standard USB socket, and receives the mobile phone-side APP control signal through a data line D+ and a data line D− during charging; a connection point of the thirty-fifth resistor and the thirty-sixth resistor is connected to an inverting input end of the first comparator CMP1; a connection point of the thirty-sixth resistor and the thirty-seventh resistor is connected to an inverting input end of the second comparator CMP2, the end DM− is connected to a connection point of the thirty-first resistor and the thirty-second resistor as well as non-inverting input ends of the first comparator and the second comparator; a connection point of the thirty-eighth resistor and the thirty-ninth resistor is connected to an inverting input end of a third comparator CMP3, a connection point of the thirty-ninth resistor and the fortieth resistor is connected to an inverting input end of a fourth comparator CMP4, the end DP+ is connected to a connection point of, the thirty-third resistor and the thirty-fourth resistor as well as non-inverting input ends of the third comparator and the fourth comparator; output ends of the first comparator and the second comparator are respectively connected to two input ends of a second NAND gate U2, output ends of the third comparator and the fourth comparator are respectively connected to two input ends of a third NAND gate U3, output ends of the second NAND gate and the third NAND gate are respectively connected to two input ends of a first NAND gate U1, an output end of the first NAND gate is connected to a control end of the switching tube Q3 through a buffer U5 and Q3 described in FIG. 5 is a PMOS transistor.

The control principle of this circuit is basically the same as the principle of the APP signal demodulation circuit controlling the cathode of the photoelectric coupler, and will not be described herein again.

Figures 6, 6A:
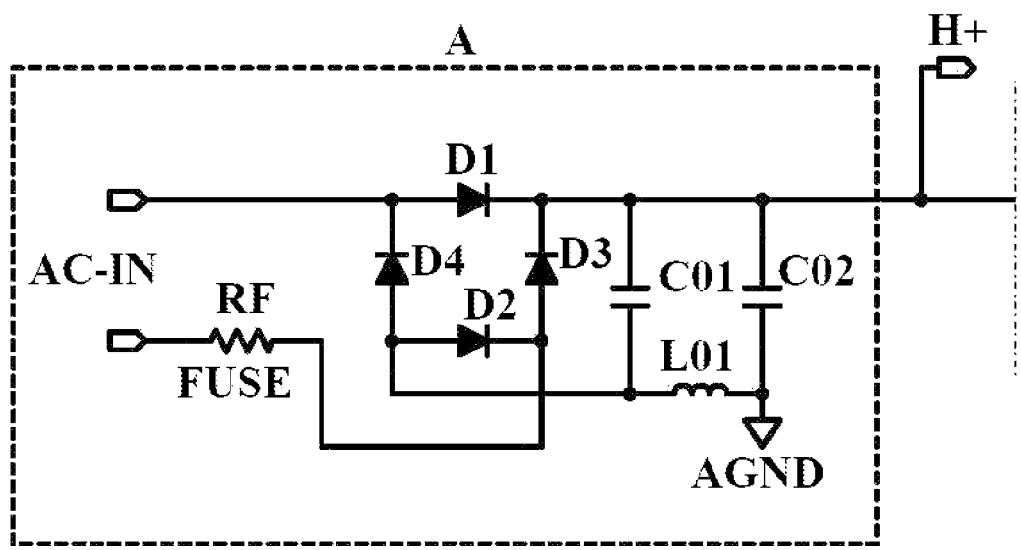
FIG. 6 with partial views FIGS. 6A-6G provide a circuit diagram illustrating that the APP signal demodulation circuit adopts a control chip and the electronic switch is connected in series in the negative output line of the bridge rectifier circuit. The approximate relationship between the partial views is provided by FIG. 6 and alignment guides on the individual partial views allow for alignment of the partial views given the guidance from FIG. 6.
Figure 6B:
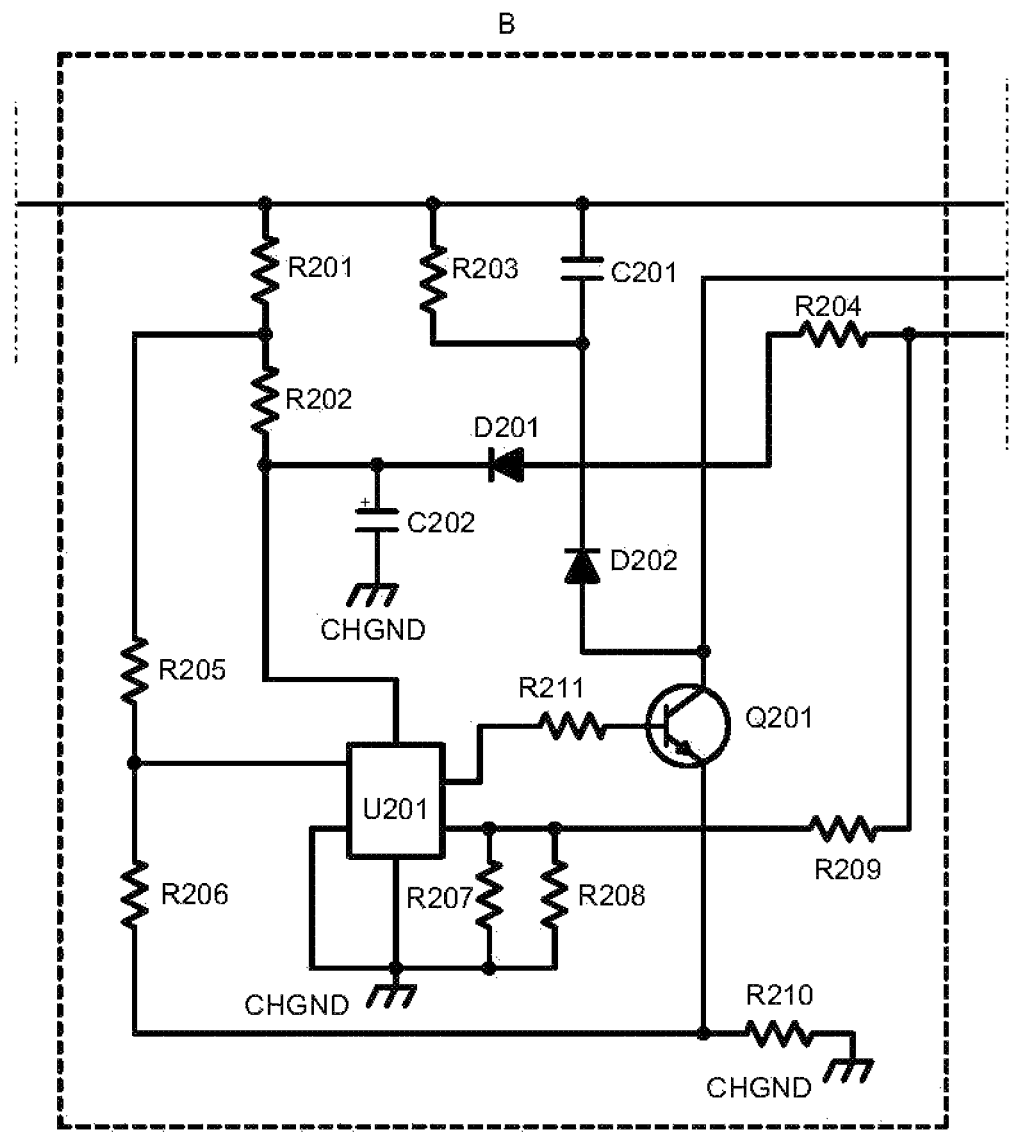
Figure 6C:
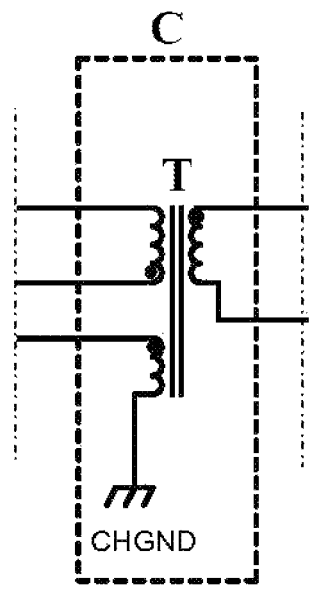
Figure 6D:
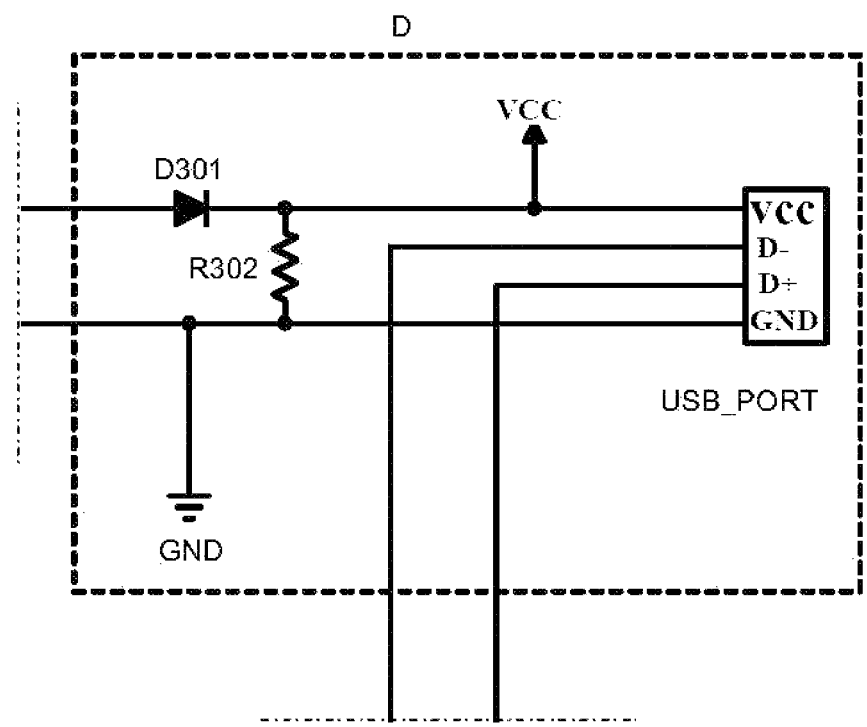
Figure 6E:
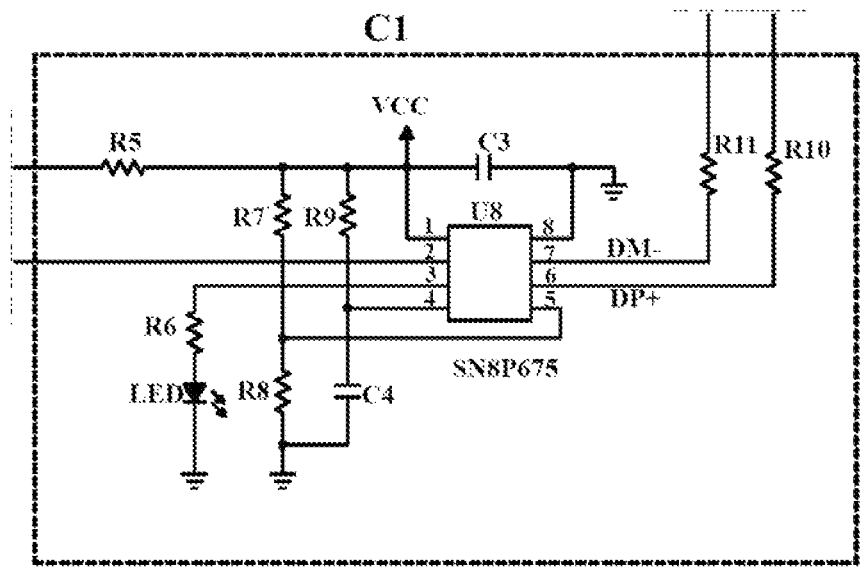
Figure 6F:
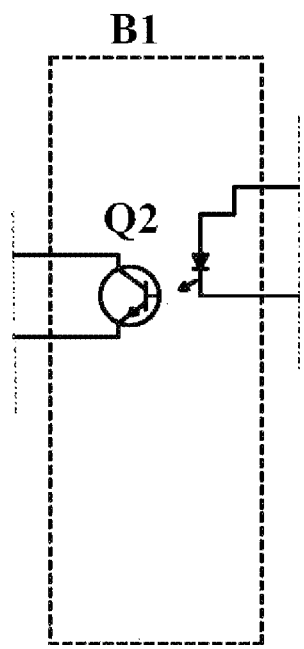
Figure 6G:
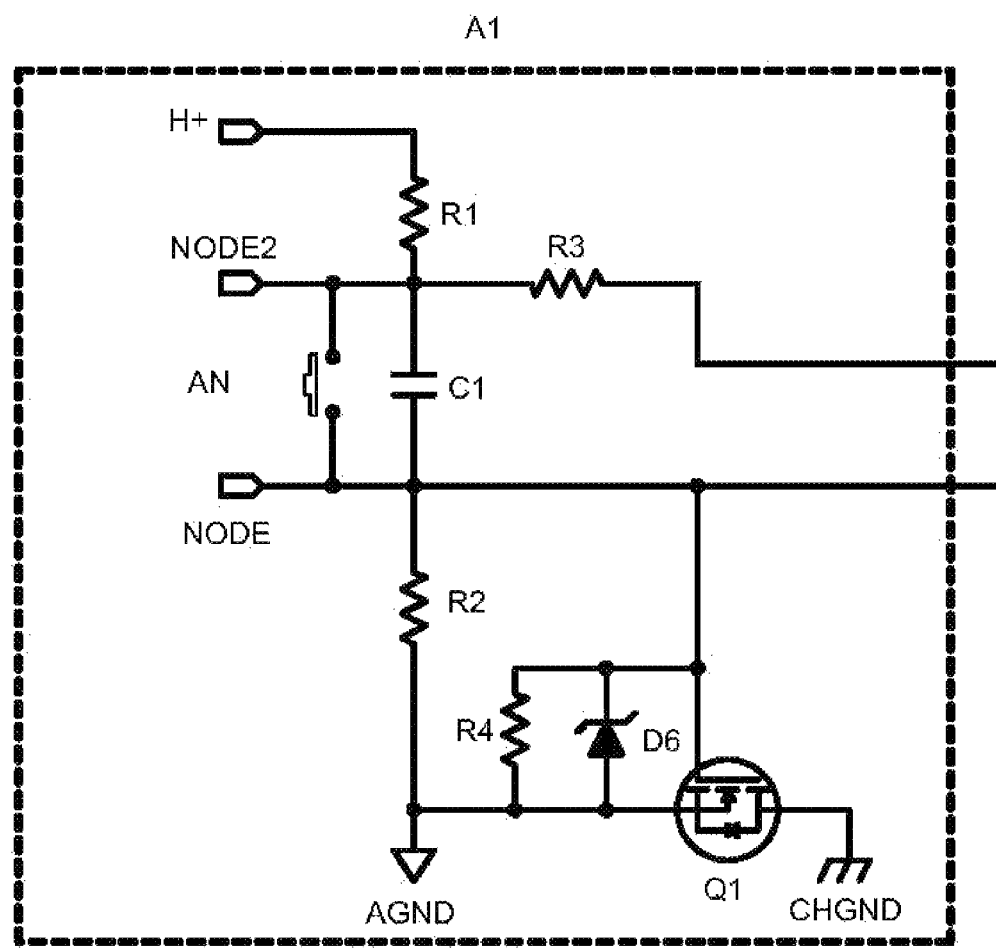
Figures 7, 7A:
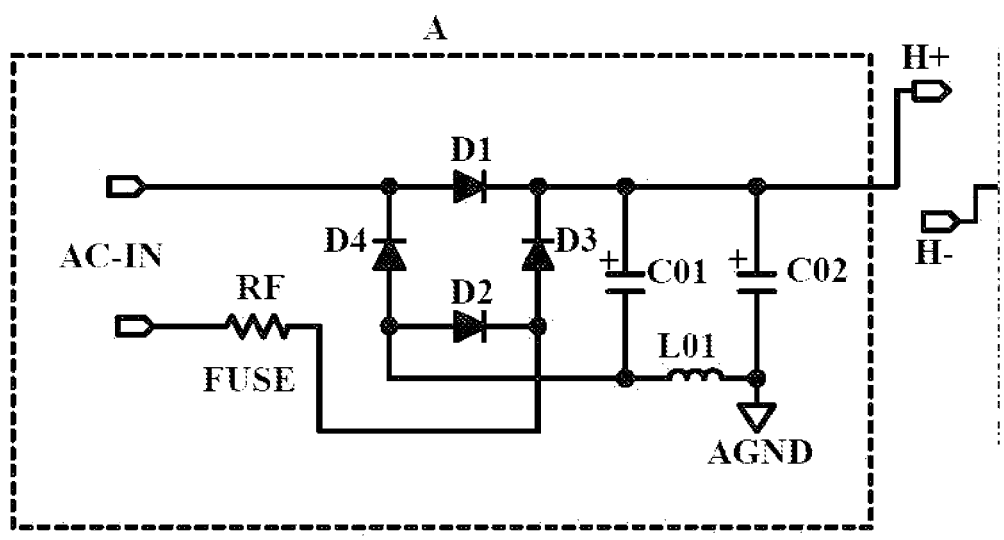
FIG. 7 with partial views FIGS. 7A-7G provide a circuit diagram illustrating that the APP signal demodulation circuit adopts a control chip and the electronic switch is connected in series in the positive output line of the bridge rectifier circuit. The approximate relationship between the partial views is provided by FIG. 7 and alignment guides on the individual partial views allow for alignment of the partial views given the guidance from FIG. 7.
Figure 7B:
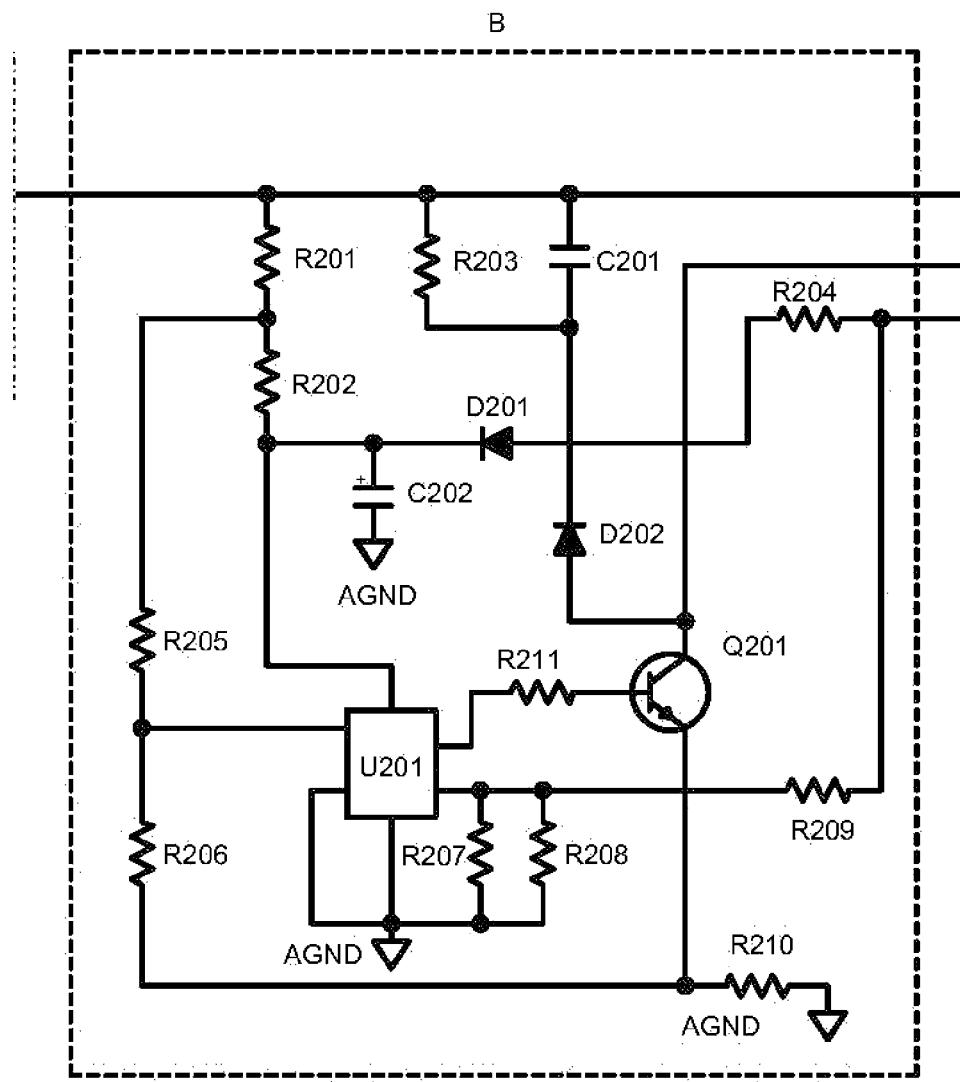
Figure 7C:
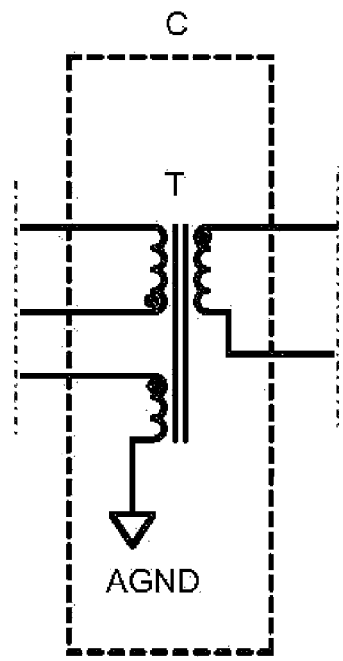
Figure 7D:
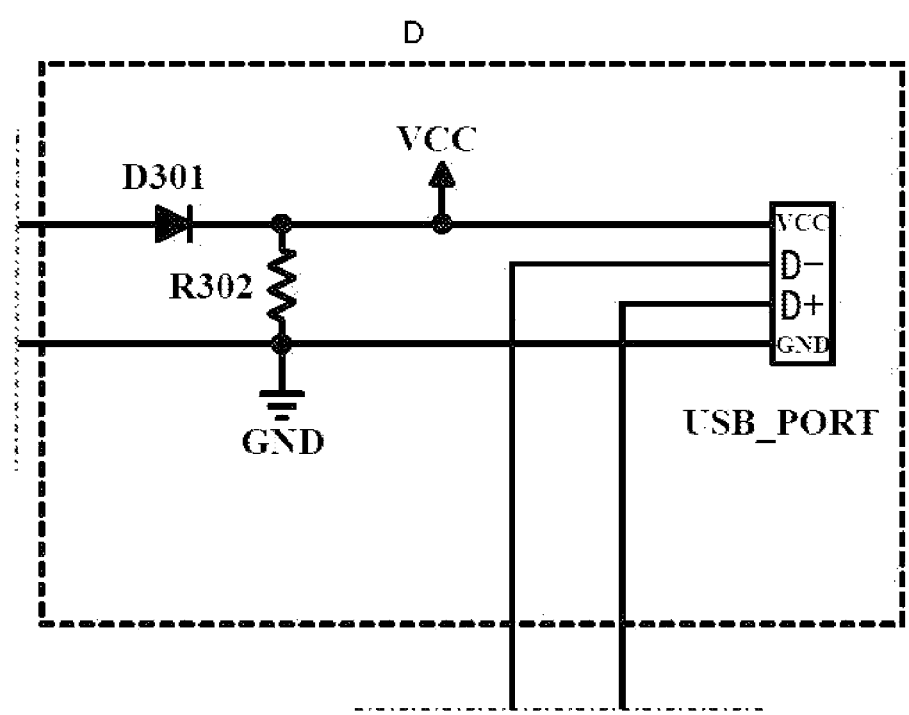
Figure 7E:
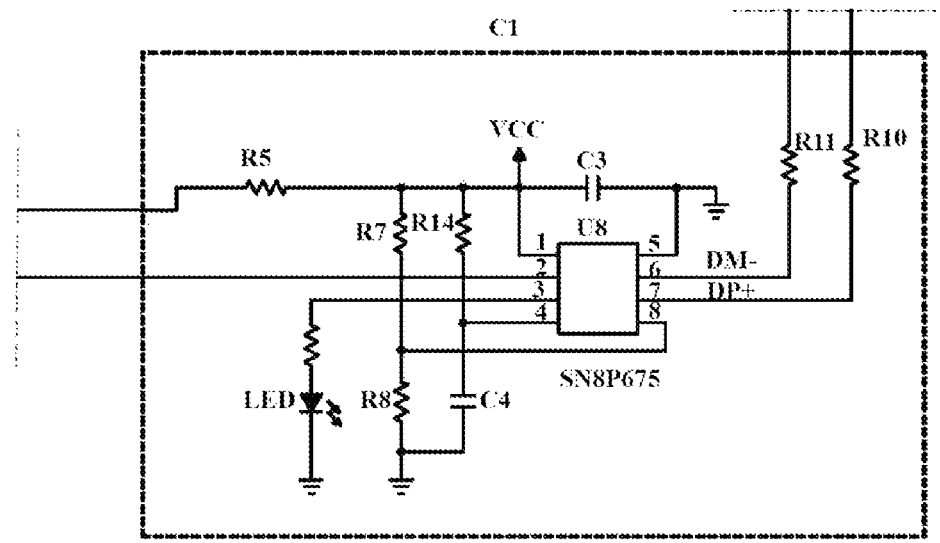
Figure 7F:
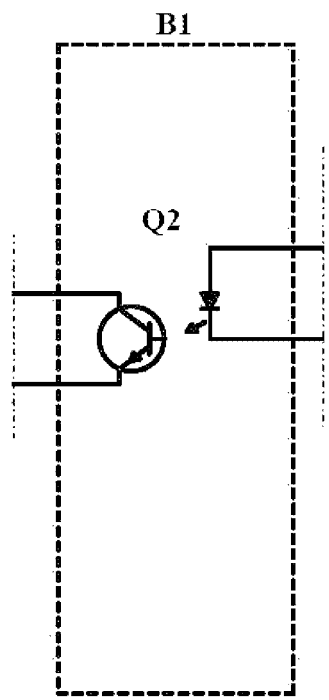
Figure 7G:
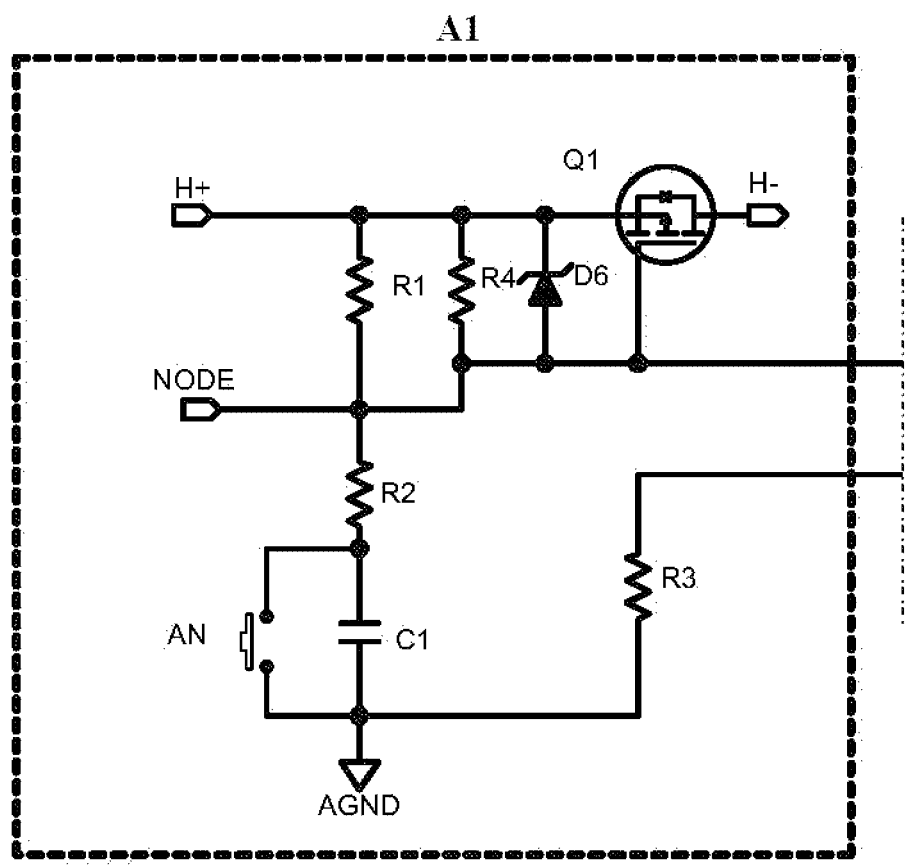

In the embodiments shown in FIG. 6 and FIG. 7, the APP signal demodulation circuit uses a control chip to control on and off of the photoelectric coupler. The difference between the two figures lies in: in FIG. 6, the power-on self-holding circuit controls connection and disconnection of the negative output line of the bridge rectifier circuit, while in FIG. 7, the power-on self-holding circuit controls connection and disconnection of the positive output line of the bridge rectifier circuit. The control principles of the two circuits are the same, and description is made below by using FIG. 6 as an example.

A direct-current power source VCC and a ground used by the APP signal demodulation circuit are connected to an output end of the low-voltage output circuit, and the APP signal demodulation circuit includes a control chip U8. In a preferred embodiment, the control chip U8 adopts an SN8P675 chip. A first pin and an eighth pin of U8 are respectively connected to VCC and the ground, two signal pins DP+ and DM− (a sixth pin and a seventh pin) of the control chip are respectively connected to ends D+ and D− in the USB socket through a tenth resistor R10 and an eleventh resistor R11; a seventh resistor R7 and an eighth resistor R8 are connected in series between the direct-current power source and the ground, and a connection point of the seventh and eighth resistors is connected to a fifth pin of the control chip and feeds back a voltage value of the direct-current power source to the control chip; a ninth resistor R9 and a fourth capacitor C4 are connected in series between the direct-current power source and the ground, and a connection point of the ninth resistor and the fourth capacitor is connected to a fourth pin of the control chip; a fifth resistor R5 and an input side of the photoelectric coupler Q2 are connected in series between the direct-current power source and a control pin (a second pin) of the control chip, and a sixth resistor R6 and an LED light are connected in series between an indication pin (a third pin) of the control chip and the ground.

At the beginning of power-on, the pin 2 of U8 outputs a low level to drive Q2 to turn on, further, the electronic switch Q1 is kept continuously on, and meanwhile, the voltage detection end (the pin of U8) detects whether the charging voltage (VCC) falls within a safe voltage range, if the voltage exceeds the safe charging voltage range, the 2nd pin of U8 will output a high-level control signal to control Q2 to cut off, further, the electronic switch Q1 cuts off and enters a power-off protected state, so as to realize overvoltage protection, and the charger realizes overvoltage protection and meanwhile realizes zero standby power consumption. When the direct-current power source falls within the safe charging voltage range, the two signal pins DP+ and DM− (pin 6 and pin 7) of the control chip send a Charger Ready signal to the mobile phone; after the mobile phone receives the Charger Ready signal through D+ and D− in the USB socket, the mobile phone APP or operating system returns a charging signal, if the control chip does not receive a charging signal of the mobile phone (for example, the charger is not connected to the mobile phone or an electrical device) within a period of time from sending of the Charger Ready signal, the control chip controls the photoelectric coupler to cut off, and the charger realizes no-load protection and enters a zero-power-consumption standby state, thereby achieving the purpose of energy saving. When the control chip receives a charging signal of the mobile phone, the control chip continues controlling the photoelectric coupler to turn on, and the charger continuously performs charging; when the control chip receives a Stop Charging signal of the mobile phone, the control chip immediately controls the photoelectric coupler to cut off, and the charger stops charging and enters an energy-saving state.

Detection and control of charging completion: after the mobile phone is connected to the charger and completes self-check, the mobile phone-side APP software or operating system detects the charging state in real time, and sends a Charging Uncompleted charging control instruction (voltage signal) to D+ and D− in real time when the battery is not fully charged, DP+ and DM− (the sixth pin and the seventh pin) of the control chip receive the charging control instruction, after arithmetic processing, the second pin is continuously controlled to output a low level, further, the electronic switch Q1 is continuously on, the charger continuously charges the mobile phone, and meanwhile, the LED enters a slow-flash state, prompting that charging is being performed. When the mobile phone-side APP software or operating system detects that the charging ends, the mobile phone-side APP software or operating system sends a Stop Charging control signal, after receiving the power-off control instruction and after arithmetic processing, the control chip controls the second pin to output a high level and controls the cathode, at the input end of the photoelectric coupler Q2 to be at a high level, the output of Q2 ends, and further, the electronic switch Q1 in the power-on self-holding circuit cuts off and the power-on self-holding circuit enters a power-off locked mode. While controlling Q2 to cut of, the 3rd pin of U8 outputs a low level and controls the LED to go off, indicating that the charging is completed. Further, the switch control circuit, the high-frequency transformer, and the low-voltage output circuit lose electricity, the charger enters a power-off state, and the circuit power consumption is reduced to zero, thereby realizing the functions of saving electrical energy, prolonging the service life of a charging device, and improving electric safety.

In a preferred embodiment, the LED light is used for displaying a working state of the charger; when the charger is connected to the mains (that is, at the beginning of power-on), the control chip U8 controls the LED light to flash quickly, indicating that the charger gets ready and can perform charging at any time. When the charger normally performs charging, the control chip controls the LED light to flash slowly. When the charger stops charging or is in a protected state and prohibited from charging, the control chip controls the LED light to go off. Evidently, the LED light also goes off when the charger is, disconnected from the mains.

The above embodiments are only for illustration, not for limitation. Any equivalent modifications or alternations to the present application without departing from the spirit and scope of the present application should fall within the scope of the claims of the present application.

I claim:

1. A mobile phone APP (application) control-based energy-saving charger, comprising a bridge rectifier circuit, a switch control circuit, a high-frequency transformer, and a low-voltage output circuit that are sequentially connected, wherein the low-voltage output circuit supplies power to a mobile phone through a charging plug, the charger further comprising: an electronic switch (Q1) connected in series between the bridge rectifier circuit and the switch control circuit, and an APP signal demodulation circuit, used for acquiring, through a port of a standard USB socket of the charger, a mobile phone-side APP control signal, demodulating the APP control signal, and outputting a control instruction according to the APP control signal;

an isolating drive circuit, connected to the APP signal demodulation circuit and used for isolated feedback of the APP control signal; and a power-on self-holding circuit, connected to the isolating drive circuit and a control end of the electronic switch, and used for controlling on and off of the electronic switch according to the isolated APP control signal, and providing a short-time ON level to the control end of the electronic switch at the beginning of power-on of the charger so as to keep the electronic switch on, wherein the power-on self-holding circuit has a power-on self-holding mode and a power-off locked mode, in the power-on self-holding mode, at the beginning of power-on, the power-on self-holding circuit provides a level sufficient to turn on the electronic switch and controls the electronic switch to be in an ON mode at the same time of power-on, and the charger enters self-holding charging; in the power-off locked mode, the mobile phone sends a Stop Charging APP control signal, the APP signal demodulation circuit demodulates the signal and outputs a charging cut-off control signal, the APP control signal is isolated by the isolating drive circuit and then transmitted to the power-on self-holding circuit, the power-on self-holding circuit enters the power-off locked state and controls the electronic switch to cut off;

wherein the isolating drive circuit comprises a photoelectric coupler (Q2), an input end of the photoelectric coupler is connected to the APP signal demodulation circuit, and an output end of the photoelectric coupler is connected to the power-on self-holding circuit;

wherein the electronic switch (Q1) adopts an NMOS transistor and is connected in series in a negative output line of the bridge rectifier circuit; and the power-on self-holding circuit comprises a first resistor (R1), a first capacitor (C1), and a second resistor (R2) that are connected in series between a positive output line and the negative output line of the bridge rectifier circuit, a third resistor (R3) is connected in series between a connection point of the first resistor and the first capacitor and a collector of the photoelectric coupler (Q2), a connection point of the first capacitor and the second resistor is connected to an emitter of the photoelectric coupler and a gate of the electronic switch, and a fourth resistor (R4) and a voltage-stabilizing tube (D6) are connected in parallel between the gate and a source of the electronic switch; a restart button (AN) is connected in parallel at two ends of the first capacitor (C1), and the restart button adopts a normally open button.

2. The mobile phone APP control-based energy-saving charger according to claim 1, wherein a direct-current power source and a ground used by the APP signal demodulation circuit are connected to an output end of the low-voltage output circuit, the direct-current power source (VCC) is connected to the ground through a fifth resistor (R5), the photoelectric coupler (Q2), and a switching tube (Q3), a forty-second resistor (R42) is disposed between the direct-current power source and the switching tube; the, direct-current power source is current-limited through a forty-first resistor (R41) and is voltage-stabilized by Z1 to provide a reference voltage source (VDD); the reference voltage source is connected to the ground through a thirty-fifth resistor (R35), a thirty-sixth resistor (R36), and a thirty-seventh resistor (R37) that are connected, in series; the reference voltage source is connected to the ground through a thirty-eighth resistor (R38), a thirty-ninth resistor (R39), and a fortieth resistor (R40) that are connected in series; the direct-current power source is connected to the ground through a thirty-first resistor (R31) and a thirty-second resistor (R32) that are connected in series;

the direct-current power source is connected to the ground through a thirty-third resistor (R33) and a thirty-fourth resistor (R34) that are connected in series; the APP signal demodulation circuit is provided with DP+ and DM− connection ends and, is separately connected to D+ and D− in the standard USB socket, and receives the mobile phone-side APP control signal through a data line D+ and a data line D− during charging; a connection point of the thirty-fifth resistor and the thirty-sixth resistor is connected to an inverting input end of a first comparator (CMP1), a connection point of the thirty-sixth resistor and the thirty-seventh resistor is connected to an inverting input end of a second comparator (CMP2), the end DM− is connected to a connection point of the thirty-first resistor and the thirty-second resistor as well as non-inverting input ends of the first comparator and the second comparator; a connection point of the thirty-eighth resistor and the thirty-ninth resistor is connected to an inverting input end of a third comparator (CMP3), a connection point of the thirty-ninth resistor and the fortieth resistor is connected to an inverting input end of a fourth comparator (CMP4), the end DP+ is connected to a connection point of the thirty-third resistor and the thirty-fourth resistor as well as non-inverting input ends of the third comparator and the fourth comparator; output ends of the first comparator and the second comparator are respectively connected to two input ends of a second NAND gate (U2), output ends of the third comparator and the fourth comparator are respectively connected to two input ends of a third NAND gate (U3), output ends of the second NAND gate arid the third NAND gate are respectively connected to two input ends of a first NAND gate (UI), and an output end of the first NAND gate is connected to a control end of the switching tube through a fourth NOT gate (U4).

3. The mobile phone APP control-based energy-saving charger according to claim 1, wherein a direct-current power source and a ground used by the APP signal demodulation circuit are connected to an output end of the low-voltage output circuit, the direct-current power source (VCC) is connected to the ground through a switching tube (Q3), a fifth resistor (R5), and the photoelectric coupler (Q2), a forty-second resistor (R42) is disposed between the switching tube (Q3) and the ground: the direct-current power source is current-limited through a forty-first resistor and is voltage-stabilized by Z1 to provide a reference voltage source (VDD); the reference voltage source is connected to the ground through a thirty-fifth resistor (R35), a thirty-sixth resistor (R36), and a thirty-seventh resistor (R37) that are connected in series; the reference voltage source is connected to the ground through a thirty-eighth resistor (R38), a thirty-ninth resistor (R39), and a fortieth resistor (R40) that are connected in series; the direct-current power source is connected to the ground through a thirty-first resistor (R31) and a thirty-second resistor (R32) that are connected in series; the direct-current power source is connected to the ground through a thirty-third resistor (R33) and a thirty-fourth resistor (R34) that are connected in series; the APP signal demodulation circuit is provided with DP+ and DM− connection ends and is separately connected to D+ and D− in the standard USB socket, and receives the mobile phone-side APP control signal through a data line D+ and a data line D− during charging; a connection point of the thirty-fifth resistor and the thirty-sixth resistor is connected to an inverting input end of the first comparator (CMP1), a connection point of the thirty-sixth resistor and the thirty-seventh resistor is connected to an inverting input end of the second comparator (CMP2), the end DM− is connected to a connection point of the thirty-first resistor and the thirty-second resistor as well as non-inverting input ends of the first comparator and the second comparator; a connection point of the thirty-eighth resistor and the thirty-ninth resistor is connected to an inverting input end of a third comparator (CMP3), connection point of the thirty-ninth resistor and the fortieth resistor is connected to an inverting input end of a fourth comparator (CMP4), the end DP+ is connected to a connection point of the thirty-third resistor and the thirty-fourth resistor as well as non-inverting input ends of the third comparator and the fourth comparator; output ends of the first comparator and the second comparator are respectively connected to two input ends of a second NAND gate (U2), output ends of the third comparator and the fourth comparator are respectively connected to two input ends of a third NAND gate (U3), output ends of the second NANO gate and the third NAND gate are respectively connected to two input ends of a first NAND gate (U1), and an output end of the first NAND gate is connected to a control end of the switching tube through a buffer (U5).

4. The mobile phone APP control-based energy-saving charger according to claim 1, wherein a direct-current power source (VCC) and a ground used by the APP signal demodulation circuit are connected to an output end of the low-voltage output circuit, the APP signal demodulation circuit comprises a control chip (U8), two signal pins of the control chip are respectively connected to ends D+ and D− in the USB socket through a tenth resistor (R10) and an eleventh resistor (R11) a seventh resistor (R7) and an eighth resistor (R8) are connected in series between the direct-current power source and the ground, a connection point of the seventh and eighth resistors feeds back a voltage value of the direct-current power source to the control chip, a fifth resistor (R5) and an input side of the photoelectric coupler (Q2) are connected in series between the direct-current power source and a control pin of the control chip, and a sixth resistor (R6) and an LED light are connected in series between an indication pin of the control chip and the ground.

5. The mobile phone APP control-based energy-saving charger according to claim 4, wherein at the beginning of power-on, the control chip (U8) drives the photoelectric coupler (Q2) to turn on, it is detected whether the direct-current power source (VCC) falls within a safe charging voltage range, if the voltage exceeds the safe charging voltage range, the control chip controls the photoelectric coupler to cut off, and the charger realizes overvoltage protection;

when the direct-current power source falls within the safe charging voltage range, the two signal pins of the control chip send a Charger Ready signal to the mobile phone; after the mobile phone receives the Charger Ready signal through D+ and D− in the USB socket, the mobile phone APP returns a charging signal, if the control chip does not receive the charging signal of the mobile phone within a period of time from sending of the Charger Ready signal, the control chip controls the photoelectric coupler to cut off, and the charger realizes no-load protection; when the control chip receives the charging signal of the mobile phone, the control chip continues controlling the photoelectric coupler to turn on, and the charger continuously performs charging;

when the control chip receives a Stop Charging signal of the mobile phone, the control chip immediately controls the photoelectric coupler to cut off, and the charger stops charging and enters an energy-saving state.

6. The mobile phone APP control-based energy-saving charger according to claim 5, wherein the LED light is used for displaying a working state of the charger; when the charger is connected to a mains, the control chip (U8) controls the LED light to flash quickly, indicating that the charger gets ready, when the charger normally performs charging, the control chip controls the LED light to flash slowly; when the charger stops charging, the control chip controls the LED light to go off.

7. The mobile phone APP control-based energy-saving charger according to claim 6, wherein the control chip (U8) adopts an SN8P675 chip.

8. A mobile phone APP (application) control-based energy-saving charger, comprising a bridge rectifier circuit, a switch control circuit, a high-frequency transformer, and a low-voltage output circuit that are sequentially connected, wherein the low-voltage output circuit supplies power to a mobile phone through a charging plug, the charger further comprising: an electronic switch (Q1) connected in series between the bridge rectifier circuit and the switch control circuit, and an APP signal demodulation circuit, used for acquiring, through a port of a standard USB socket of the charger, a mobile phone-side APP control signal, demodulating the APP control signal, and outputting a control instruction according to the APP control signal;

an isolating drive circuit, connected to the APP signal demodulation circuit and used for isolated feedback of the APP control signal; and a power-on self-holding circuit, connected to the isolating drive circuit and a control end of the electronic switch, and used for controlling on and off of the electronic switch according to the isolated APP control signal, and providing a short-time ON level to the control end of the electronic switch at the beginning of power-on of the charger so as to keep the electronic switch on, wherein the power-on self-holding circuit has a power-on self-holding mode and a power-off locked mode, in the power-on self-holding mode, at the beginning of power-on, the power-on self-holding circuit provides a level sufficient to turn on the electronic switch and controls the electronic switch to be in an ON mode at the same time of power-on, and the charger enters self-holding charging; in the power-off locked mode, the mobile phone sends a Stop Charging APP control signal, the APP signal demodulation circuit demodulates the signal and outputs a charging cut-off control signal, the APP control signal is isolated by the isolating drive circuit and then transmitted to the power-on self-holding circuit, the power-on self-holding circuit enters the power-off locked state and controls the electronic switch to cut off;

wherein the isolating drive circuit comprises a photoelectric coupler (Q2), an input end of the photoelectric coupler is connected to the APP signal demodulation circuit, and an output end of the photoelectric coupler is connected to the power-on self-holding circuit;

wherein the electronic switch (Q1) adopts a PMOS transistor and is connected in series in a positive output line of the bridge rectifier circuit, and the power-on self-holding circuit comprises a first resistor (R1), a second resistor (R2), and a first capacitor (C1) that are connected in series between the positive output line and a negative output line of the bridge rectifier circuit, a connection point of the first resistor and the second resistor is connected to a gate of the electronic switch and a collector of the photoelectric coupler (Q2), an emitter of the photoelectric coupler is connected to the negative output line of the bridge rectifier circuit through a third resistor (R3), and a fourth resistor (R4) and a voltage-stabilizing tube (D6) are connected in parallel between the gate and a source of the electronic switch; a restart button (AN) is connected in parallel at two ends of the first capacitor (C1), and the restart button adopts a normally open button.

* * * * *